United States Patent
Wakimoto

(10) Patent No.: US 8,913,212 B2
(45) Date of Patent: Dec. 16, 2014

(54) DISPLAY DEVICE AND DRIVING METHOD FOR DISPLAY DEVICE

(75) Inventor: Kenichi Wakimoto, Hokkai-do (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 17 days.

(21) Appl. No.: 13/252,228

(22) Filed: Oct. 4, 2011

(65) Prior Publication Data

US 2012/0092587 A1    Apr. 19, 2012

(30) Foreign Application Priority Data

Oct. 14, 2010    (JP) .................................. 2010-231315

(51) Int. Cl.
*G02F 1/1335*    (2006.01)
*G09F 13/08*    (2006.01)
*F21V 7/04*    (2006.01)
*G09G 3/36*    (2006.01)
*G09G 3/34*    (2006.01)

(52) U.S. Cl.
CPC ............ *G02F 1/133603* (2013.01); *G09G 3/36* (2013.01); *G09G 3/3413* (2013.01); *G09G 3/3426* (2013.01); *G09G 2310/0235* (2013.01); *G02F 1/133621* (2013.01)
USPC .............. 349/62; 349/61; 349/112; 362/97.3; 362/612; 362/615; 645/84; 645/87; 645/102

(58) Field of Classification Search
USPC ............. 349/61–69; 362/97.3, 600, 615, 612; 345/84, 87, 102
See application file for complete search history.

(56) References Cited

U.S. PATENT DOCUMENTS

| | | | |
|---|---|---|---|
| 6,597,348 B1 | 7/2003 | Yamazaki et al. | |
| 7,113,164 B1* | 9/2006 | Kurihara | ....................... 345/102 |
| 7,145,536 B1 | 12/2006 | Yamazaki et al. | |
| 7,317,438 B2 | 1/2008 | Yamazaki et al. | |
| 7,385,579 B2 | 6/2008 | Satake | |
| 7,403,177 B2 | 7/2008 | Tanada et al. | |
| 7,637,626 B2* | 12/2009 | Park et al. | ..................... 362/97.3 |
| 7,738,055 B2 | 6/2010 | Egi et al. | |
| 7,773,066 B2 | 8/2010 | Yamazaki et al. | |

(Continued)

FOREIGN PATENT DOCUMENTS

| JP | 2001-210122 | 8/2001 |
|---|---|---|
| JP | 2005-316092 | 11/2005 |

*Primary Examiner* — Michael Caley
*Assistant Examiner* — Jia Pan
(74) *Attorney, Agent, or Firm* — Eric J. Robinson; Robinson Intellectual Property Law Office, P.C.

(57) ABSTRACT

An object is to suppress degradation of an image quality of a display image. A plurality of display circuits arranged in M rows (M is a natural number of 2 or more) and N columns (N is a natural number) and a light unit are included; the light unit includes a plurality of light-emitting diode groups arranged in X rows (X is a natural number of 2 or more), overlaps with a display circuit in at least different one or more rows every row, and includes a light-emitting diode emitting red light, a light-emitting diode emitting green light and a light-emitting diode emitting blue light and a light guide plate formed between the plurality of display circuits and the plurality of light-emitting diode groups. The light guide plate includes X light guide members which transmits the light of the light-emitting diode groups in the rows different from each other.

18 Claims, 12 Drawing Sheets

(56) References Cited

U.S. PATENT DOCUMENTS

| | | |
|---|---|---|
| 7,791,571 B2 | 9/2010 | Ohtani et al. |
| 7,834,830 B2 | 11/2010 | Yamazaki et al. |
| 7,855,770 B2 | 12/2010 | Egi et al. |
| 7,956,838 B2 * | 6/2011 | Mizumaki ............... 345/102 |
| 8,537,086 B2 | 9/2013 | Koyama et al. |
| 8,564,529 B2 | 10/2013 | Kurokawa et al. |
| 8,564,629 B2 | 10/2013 | Toyotaka et al. |
| 8,643,580 B2 | 2/2014 | Kurokawa et al. |
| 2003/0174491 A1 * | 9/2003 | Ohizumi et al. ............ 362/31 |
| 2004/0218388 A1 * | 11/2004 | Suzuki ................... 362/231 |
| 2006/0050047 A1 * | 3/2006 | Jin et al. ................ 345/102 |
| 2006/0239629 A1 * | 10/2006 | Qi et al. ................. 385/146 |
| 2007/0211000 A1 * | 9/2007 | Itoh et al. ................ 345/83 |
| 2007/0279374 A1 | 12/2007 | Kimura et al. |
| 2010/0053506 A1 * | 3/2010 | Bae et al. ................ 349/69 |
| 2010/0110337 A1 * | 5/2010 | Shin et al. .............. 349/64 |
| 2010/0265432 A1 * | 10/2010 | Masuda et al. ........... 349/62 |
| 2010/0321420 A1 | 12/2010 | Ohtani et al. |
| 2011/0001725 A1 | 1/2011 | Kurokawa |
| 2011/0025729 A1 | 2/2011 | Yamazaki et al. |
| 2011/0051034 A1 | 3/2011 | Egi et al. |
| 2011/0157216 A1 | 6/2011 | Yamazaki et al. |
| 2011/0157253 A1 | 6/2011 | Yamazaki et al. |
| 2011/0175873 A1 | 7/2011 | Miyake |
| 2011/0175941 A1 | 7/2011 | Miyake et al. |
| 2011/0241011 A1 | 10/2011 | Koyama et al. |
| 2011/0242071 A1 | 10/2011 | Koyama et al. |
| 2011/0242100 A1 | 10/2011 | Yamazaki et al. |
| 2011/0248970 A1 | 10/2011 | Koyama et al. |
| 2011/0248978 A1 | 10/2011 | Koyama et al. |
| 2011/0249037 A1 | 10/2011 | Koyama et al. |
| 2011/0249038 A1 | 10/2011 | Yamazaki et al. |
| 2011/0292088 A1 | 12/2011 | Toyotaka et al. |
| 2011/0299003 A1 | 12/2011 | Arasawa et al. |
| 2011/0310061 A1 | 12/2011 | Ikeda et al. |
| 2011/0310063 A1 | 12/2011 | Kurokawa et al. |
| 2011/0310132 A1 | 12/2011 | Kurokawa et al. |
| 2011/0310133 A1 | 12/2011 | Koyama et al. |
| 2011/0316818 A1 | 12/2011 | Koyama et al. |
| 2012/0001878 A1 | 1/2012 | Kurokawa et al. |
| 2012/0001953 A1 | 1/2012 | Hirakata et al. |
| 2012/0001954 A1 | 1/2012 | Yamazaki et al. |
| 2012/0001955 A1 | 1/2012 | Yamazaki et al. |
| 2012/0002127 A1 | 1/2012 | Yamazaki et al. |
| 2012/0002132 A1 | 1/2012 | Yamazaki et al. |
| 2012/0002133 A1 | 1/2012 | Yamazaki et al. |
| 2012/0019567 A1 | 1/2012 | Yamazaki et al. |
| 2012/0026163 A1 | 2/2012 | Koyama et al. |
| 2012/0032996 A1 | 2/2012 | Miyake |
| 2012/0033151 A1 | 2/2012 | Toyotaka et al. |
| 2012/0050348 A1 | 3/2012 | Kurokawa et al. |
| 2012/0062614 A1 | 3/2012 | Miyake |
| 2012/0062811 A1 | 3/2012 | Miyake |

* cited by examiner

DISPLAY DEVICE AND DRIVING METHOD FOR DISPLAY DEVICE

BACKGROUND OF THE INVENTION

1. Field of the Invention

One embodiment of the present invention relates to a display device.

2. Description of the Related Art

In recent years, a display device using a method in which a color image can be displayed by changing a color of light emitted from a light unit (including a backlight) to a pixel circuit (also referred to as a display circuit) every unit period (also referred to as a field-sequential method) has been developed. When a field-sequential method is employed, for example, a color filter is not needed in a liquid crystal display device, and thus, light transmittance can be increased.

As an example of a field-sequential display device, a liquid crystal display device in which all pixel circuits are placed in a display state based on display data and an image is displayed is given, for example, by including a light unit including a plurality of light-emitting diodes, sequentially writing display data to pixel circuits in each row, and setting a light-emitting diode overlapping with pixel circuits in plural rows in which display data is written in a light-emitting state (e.g., Patent Document 1).

REFERENCE

Patent Document

[Patent Document 1] Japanese Published Patent Application No. 2005-316092

SUMMARY OF THE INVENTION

In a liquid crystal display device disclosed in Patent Document 1, display data is sequentially written into pixel circuits in each row, then light-emitting diodes overlapping with pixel circuits in plural rows in which display data is written are made emit light, and light is delivered from the light-emitting diodes to the pixel circuits, so that an image is displayed. Therefore, in some cases, while display data corresponding to a specific color is written in pixel circuits in a specific group including pixel circuits in plural rows, light from light-emitting diode which emits different color from the specific color may be irradiated to the pixel circuits in the specific group. In this case, the image quality of a display image is degraded.

In order to solve the above problem, for example, there is a method for providing a period for displaying a black image. However, in a period for displaying a black image, the light transmittance is reduced and the luminance of an image is lowered. In addition, in order to solve the above problem of degradation in image quality, there is also a method for adjusting a distance between a light-emitting diode and a pixel circuit. However, for example, if there is a variation in luminance between a plurality of light-emitting diodes which emit light of the same color, it is difficult to solve the above problem by adjusting a distance between a light-emitting diode and a pixel circuit.

An object of one embodiment of the present invention is to suppress degradation in quality of display images. Further, another object of one embodiment of the present invention is to suppress degradation in luminance of display images.

In an embodiment of the present invention, in each of a plurality of display regions divided according to display circuits in plural rows, a pulse of a display selection signal is input to the display circuits in each row; light-emitting diodes in light-emitting diode groups sequentially emit light every time a pulse of the display selection signal is input to display circuits in one or more rows; light is sequentially delivered to the display circuits in each row to which a pulse of the display selection signal is input; so that an image is displayed.

Further, in an embodiment of the present invention, a light unit including light-emitting diode groups arranged in plural rows and a light guide plate is included. The light guide plate is formed using a plurality of light guide members. By delivering light from the light-emitting diodes in each row to the display circuit through different light guide members, a diffusion direction of light from the light-emitting diodes can be controlled.

According to one embodiment of the present invention, a diffusing direction of light from a light-emitting diode can be controlled, so that degradation in the image quality of a display image can be suppressed. Moreover, degradation in luminance of a display image can be suppressed.

BRIEF DESCRIPTION OF THE DRAWINGS

In the accompanying drawings:

FIGS. 2A-1 and 2A-2 are diagrams illustrating an example of a structure of a display device in Embodiment 1;

DETAILED DESCRIPTION OF THE INVENTION

Examples of embodiments for describing the present invention will be explained below with reference to the drawings. Note that it is easy for those skilled in the art to change contents in an embodiment without departing from the spirit and the scope of the present invention. Thus, the present invention should not be limited to the description of the following embodiments.

Note that the contents in different embodiments can be combined with one another as appropriate. In addition, the contents in each embodiment can be interchanged with one another.

Further, ordinal numbers such as "first" and "second" are added for avoiding confusion between components and the number of components is not limited to the number of ordinal numbers.

Embodiment 1

In this embodiment, examples of a field-sequential display device will be described.

Examples of the display device in this embodiment will be described with reference to FIGS. 1A, 1B-1, and 1B-2.

First, a structural example of the display device in this embodiment will be described with reference to FIG. 1A.

Figure 1A:
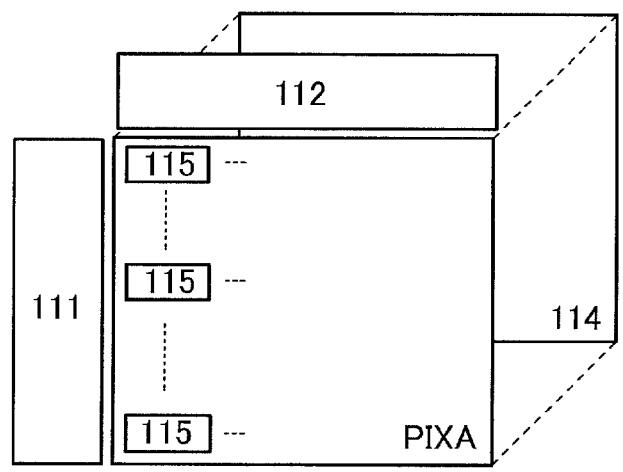
FIGS. 1A, 1B-1, and 1B-2 are diagrams explaining an example of a display device in Embodiment 1.

The display device illustrated in FIG. 1A includes a display driver circuit (also referred to as DISPDRV) 111, a display data signal output circuit (also referred to as DDOUT) 112, a light unit (also referred to as LIGHT) 114, and a plurality of display circuits (also referred to as DISP) 115.

The display driver circuit 111 is a circuit for driving the display circuits 115, and has a function of outputting a plurality of display selection signals (also referred to as signals DSEL) that are pulse signals.

The display driver circuit 111 includes, for example, a shift register. The display driver circuit 111 can output a display selection signal by outputting a pulse signal from the shift register.

An image signal is input to the display data signal output circuit 112. The display data signal output circuit 112 has a function of generating a display data signal (also referred to as a signal DD) on the basis of the input image signal and outputting the generated display data signal.

The display data signal output circuit 112 includes a switching transistor, for example.

In the display device, the transistor has two terminals and a current control terminal that controls a current flowing between the two terminals with an applied voltage. Note that without limitation to the transistor, in an element, terminals between which flowing current is controlled are also referred to as current terminals. Two current terminals are also referred to as a first current terminal and a second current terminal.

In the display device, a field-effect transistor can be used as a transistor, for example. In a field-effect transistor, a first current terminal is one of a source and a drain, a second current terminal is the other of the source and the drain, and a current control terminal is a gate.

In general, voltage refers to as a difference between potentials at two points (also referred to as a potential difference). However, values of both a voltage and a potential are sometimes represented in volts (V) in a circuit diagram or the like in some cases, so that it is difficult to discriminate between them. This is why in this specification, a potential difference between a potential at one point and a potential to be the reference (also referred to as the reference potential) is used as a voltage at the point in some cases unless otherwise specified.

The display data signal output circuit 112 can output data of an image signal as a display data signal when the switching transistor is on. The switching transistor can be controlled by inputting a control signal that is a pulse signal to the current control terminal. Note that in the case where there are a plurality of display circuits 115, data of image signals may be output as a plurality of display data signals by selectively turn on or off a plurality of switching transistors.

The light unit 114 is a light-emitting unit, which includes a plurality of light-emitting diode groups arranged in X rows and a light guide plate. The light-emitting diode emits light of wavelengths in the visible light region (e.g., wavelengths in the range of 360 nm to 830 nm).

The light-emitting diode group includes a light-emitting diode which emits red light (also referred to as a red light-emitting diode), a light-emitting diode which emits green light (also referred to as a green light-emitting diode), and a light-emitting diode which emits blue light (also referred to as a blue light-emitting diode).

The light guide plate includes X light guide members. The X light guide members transmit light of the plurality of light-emitting diode groups in the respective TOWS.

Note that, for example, it is also acceptable that a control circuit that controls light emission of a light-emitting diode is provided and light emission of the light-emitting diode is controlled in accordance with a control signal, which is a pulse signal, input to the control circuit.

Figures 1, 1B:
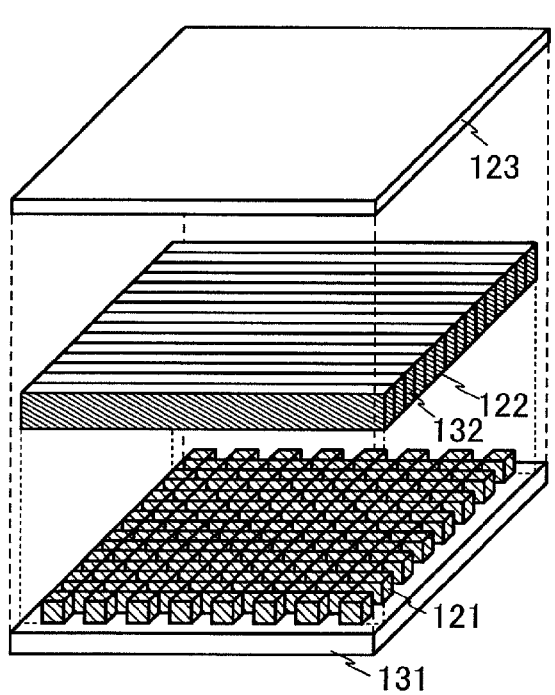
Figures 1, 1B, 2:
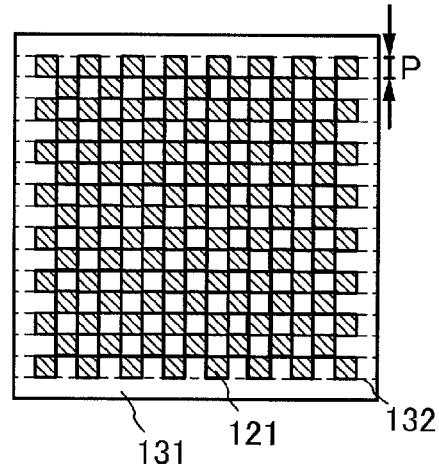

Moreover, a structural example of the light unit 114 will be described with reference to FIG. 1B-1 and FIG. 1B-2. FIG. 1B-1 and FIG. 1B-2 are schematic views for explaining a structural example of the light unit in the display device shown in FIG. 1A. FIG. 1B-1 is a schematic external view and FIG. 1B-2 is a schematic top view.

The light unit includes a plurality of LED chips 121, a light guide plate 122, and a diffusion sheet 123 as shown in FIG. 1B-1 and FIG. 1B-2. Note that in the light unit of the display device in this embodiment, the distance between each of the LED chips 121, the light guide plate 122, and the diffusion sheet 123 is not limited to the distance shown in FIG. 1B-1.

The LED chip 121 includes the above-described light-emitting diode group. A plurality of the LED chips 121 is arranged in a grid of 15 rows as shown in FIG. 1B-2. That is, a plurality of light-emitting diode groups is arranged in grid. Each of the plurality of the LED chips 121 is provided on one surface of a substrate 131.

The light guide plate 122 includes X light guide members 132. The X light guide members 132 are arranged in the column direction of the LED chips 121, and transmit light of the light-emitting diode groups in the rows which differ from each other. In other words, the X light guide members 132 transmit light of the light-emitting diode groups in the LED chips 121 in the rows which differ from each other. Note that the distance between the light-emitting diode groups in the LED chips 121 and the light guide plate 122 is set as appropriate. For example, the LED chips 121 and the light guide plate 122 may be in contact with each other.

A light-transmitting material can be used for the light guide member 132. For example, an acrylic resin or the like can be used.

A rectangular solid with a rectangular cross section can be used for the light guide member 132. In that case, as illustrated in FIG. 1B-2, the plurality of the light guide members 132 (a dotted line portion) at least overlap with the light-emitting diode groups in the rows which differ from each other. In other words, top and bottom surfaces of the plurality of the light guide members 132 overlap with the light-emitting diode groups in the LED chips 121 in the rows which differ from each other. The top and bottom surfaces of the light guide member 132 have light-transmitting properties, and a side surface of the light guide member 132 has light-reflecting properties. By using a rectangular solid whose section is a rectangle for the light guide member 132, attenuation of the light which enters from the light-emitting diode can be reduced. For example, a light-reflecting film is formed on the side surface of the light guide member 132 in the light guide plate 122. Note that the light-transmitting properties of the top and bottom surfaces of the light guide member 132 may be increased by performing polishing treatment on the top and bottom surfaces of the light guide member 132.

Further, a rectangular solid whose section is a parallelogram can be used for the light guide member 132. In that case, at least bottom surfaces of the plurality of the light guide members 132 overlap with the light-emitting diode groups in the LED chips 121 in the rows which differ from each other. By using a rectangular solid whose section is a parallelogram for the light guide member 132, the light can be easily diffused in the intended row direction by the light guide member 132.

As a light-reflecting film, a metal film such as an aluminum film can be used, for example. A metal film can be formed by an evaporation method or plating treatment (e.g., electroless plating, or the like). Note that thickness of the light-reflecting film is preferably 0.2 µm or larger. By setting the thickness of the light-reflecting film to be 0.2 µm or larger, light leakage through the light-reflecting film can be suppressed.

In addition, a plurality of the light guide members 132 can be attached using an adhesive, for example. As the adhesive, for example, an adhesive including an epoxy resin or a urethane resin can be used. By using an adhesive which includes an epoxy resin or a urethane resin, corrosion of the light guide member 132 can be suppressed. Alternatively, a light-reflective material may be used for an adhesive. By using a light-reflecting material as the adhesive, the light-reflecting function can be given to the side surface of the light guide member 132 without additionally providing a light-reflecting film.

Figures 1, 2A:
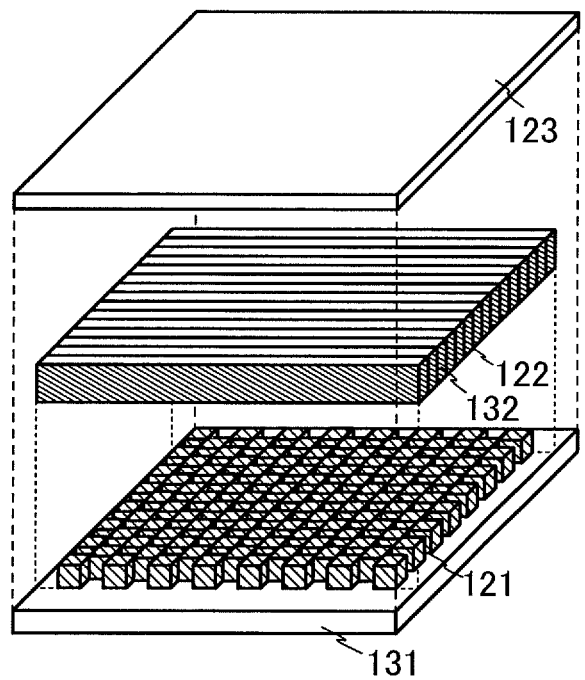
Figures 2, 2A:
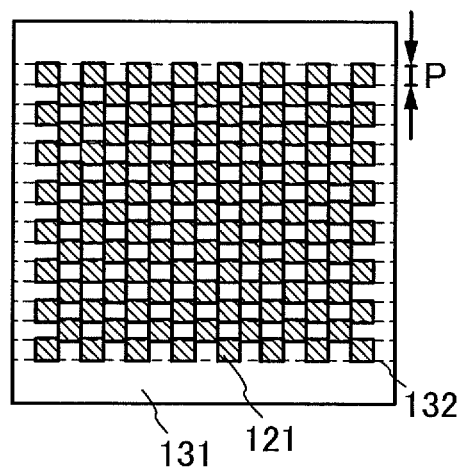

Moreover, for example, the pattern of the arrangement of a plurality of the LED chips 121 may be a staggered pattern in which the LED chips 121 in plural rows overlap with each other in the plain view as shown in FIG. 2A-1 and FIG. 2A-2. That is, a plurality of light-emitting diode groups may be arranged in a staggered pattern. By arranging a plurality of light-emitting diode groups in a staggered pattern, the width P in the column direction of a plurality of the light guide members 132 can be narrower than that in the light unit shown in FIG. 1B-2, and the number of rows of the display circuits which overlap with one light guide member 132 can be decreased. Thus, light to be emitted can be controlled for the display circuits 115 of a fewer rows.

A diffusion sheet 123 has a function of diffusing the light from the light-emitting diode groups in the LED chips 121. The diffusion sheet 123 is not necessarily provided, but the generation of an unnecessary darkline in a display image can be suppressed by providing the diffusion sheet 123.

As the diffusion sheet 123, a sheet by which the light is diffused in a circular pattern or an elliptic pattern can be used. For example, by using the sheet on which the light is diffused in an elliptic pattern, the number of the LED chips 121, i.e., light-emitting diode groups can be decreased.

The distance between the light guide plate 122 and the diffusion sheet 123 is preferably set (e.g., the distance is set to be 5 mm or smaller) according to the diffusion coefficient of the diffusion sheet 123. The above is the structural example of the light unit 114 in the display device in FIG. 1A.

Further, a plurality of the display circuits 115 shown in FIG. 1A is arranged in M rows (M is a natural number of 2 or more) and N columns (N is a natural number), and overlaps with the light unit 114. For example, the display circuits 115 in each row overlap with light-emitting diode groups in their respective one row in the light unit 114. To the display circuit 115, a display selection signal, which is a pulse signal, is input, and a display data signal is input in accordance with the input display selection signal. The display circuit 115 has a function of changing its display state in accordance with data of the input display data signal.

Note that one or more display circuits 115 form one pixel. Thus, a region where the display circuit 115 is provided is also referred to as a pixel portion (also referred to as PIXA).

The display circuit 115 includes, for example, a display selection transistor and a display element.

The display selection transistor has a function of selecting whether data of a display data signal is input to the display element.

The display element changes its display state in accordance with data of a display data signal by input of the data of the display data signal with the display selection transistor.

As the display element, a liquid crystal element can be used, for example. Note that the display element is not limited to the liquid crystal element and can be other display elements such as an electroluminescence element, for example.

As a display mode of the display device including a liquid crystal element, any of the following modes can be used, for example: a TN (twisted nematic) mode, an IPS (in-plane-switching) mode, an STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, an FFS (fringe field switching) mode.

Next, as an example of a method for driving the display device of this embodiment, an example of a method for driving the display device illustrated in FIGS. 1A, 1B-1, and 1B-2 will be described.

In the display device illustrated in FIGS. 1A, 1B-1, and 1B-2, input operation and light-emitting operation are repeated Z times (Z is a natural number of 3 or more).

In the input operation, pulses of different display selection signals are sequentially input to the display circuits 115 in all the rows. For example, in the display device illustrated in FIGS. 1A, 1B-1, and 1B-2, the display portion is divided into a plurality of display regions each including display circuits and light-emitting diode groups provided in one or more rows, and in each of the plurality of display regions, pulses of different display selection signals are sequentially input to the display circuits 115 in respective rows.

For example, in the case where the display driver circuit 111 includes a shift register, a pulse of a start pulse signal is input to the shift register, and pulses of a plurality of pulse signals of the shift register are sequentially output. Moreover, another pulse of a start pulse signal is input while the pulses of the plurality of pulse signals of the shift register are sequentially output. Thus, the operation of sequentially inputting pulses of different display selection signals to the display circuits 115 in different rows can be repeated in the plurality of display regions.

A display data signal is input to the display circuit 115 while a pulse of a display selection signal is input to the display circuit 115, and the display circuit 115 is brought into a writing state (also referred to as a state wt). Moreover, after a pulse of a display selection signal is input, the display circuit 115 is brought into a display state corresponding to the input display data (also referred to as a state hld).

In the light-emitting operation, one or more of a red light-emitting diode, a green light-emitting diode, and a blue light-emitting diode emit light every time a pulse of a display selection signal is input to the display circuits 115 in at least one row. For example, among at least one of a red light-emitting diode, a green light-emitting diode, and a blue light-emitting diode of light-emitting diode groups in different rows, light-emitting diodes which exhibit light of different colors in a plurality of display regions emit light in each of the above plurality of the display regions every time a pulse of a display selection signal is input to the display circuits 115 in at least one row. Thus, the light is delivered sequentially from the light-emitting diode groups to the display circuits to which the pulse of the display selection signal is input.

When the input operation and the light-emitting operation are repeated several times, in K-th light-emitting operation (K is a natural number of 2 or more and Z or less), a light-emitting diode which emits light of a color different from that in (K−1)-th light-emitting operation emits light. For example, in K-th light-emitting operation, a light-emitting diode which shows a color which is different from that in (K−1)-th light-emitting operation emits light in each of the plurality of display regions.

Figure 3:
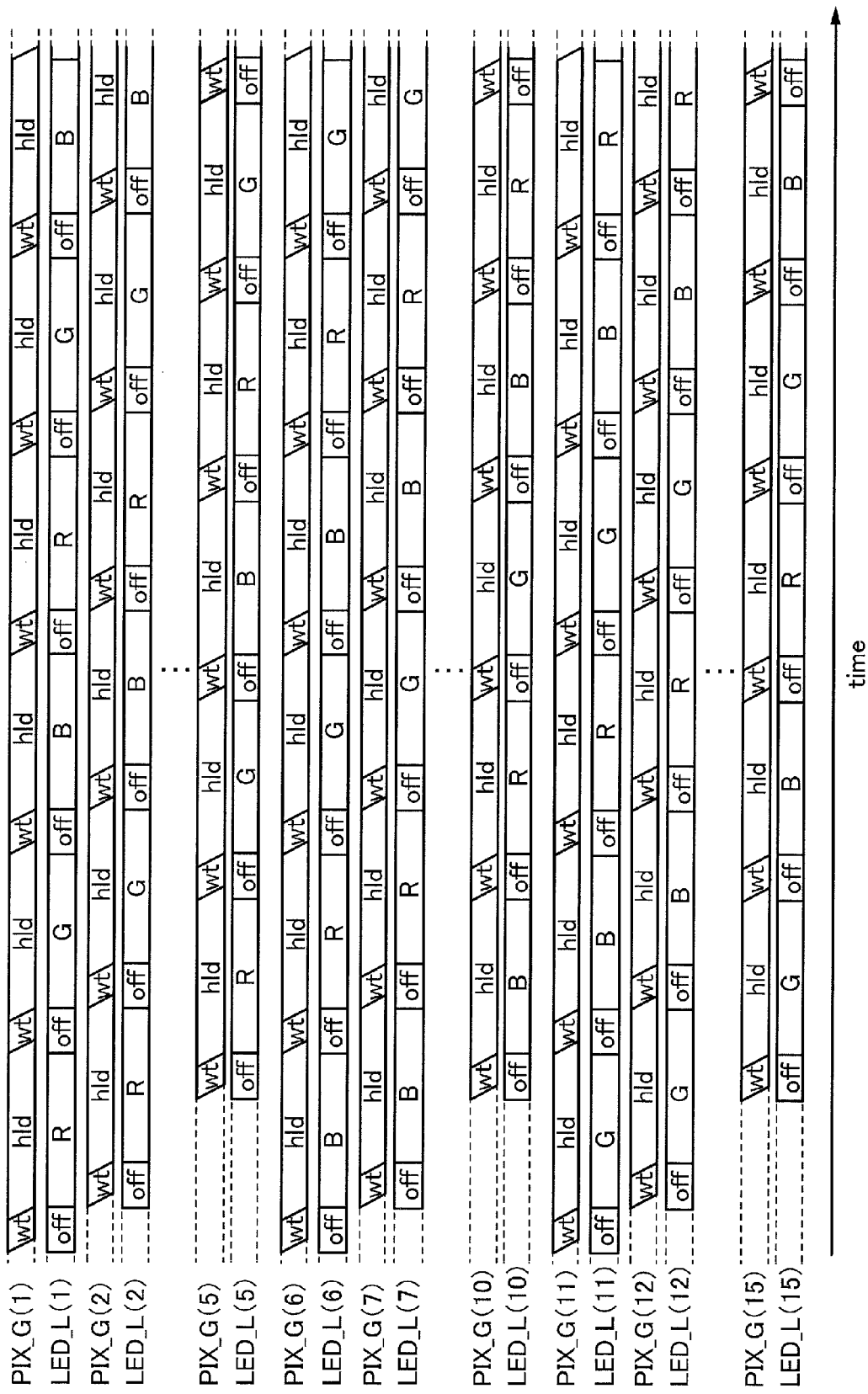
FIG. 3 is a timing chart explaining an example of a driving method for the display device in FIGS. 1A, 1B-1, and 1B-2.
Figure 4:
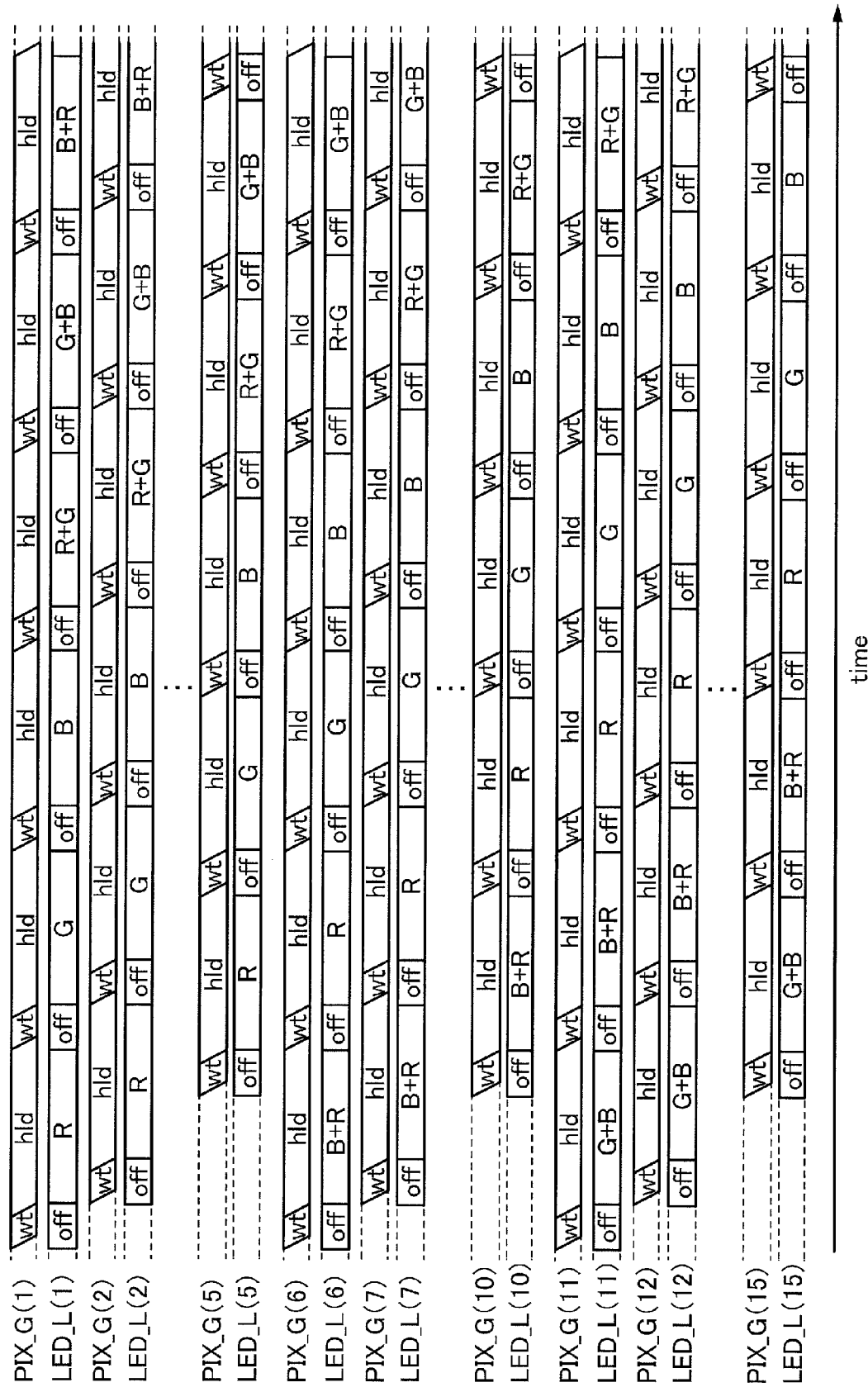
FIG. 4 is a timing chart explaining an example of a driving method for the display device in FIGS. 1A, 1B-1, and 1B-2.

Further, an example of a method for driving the display device shown in FIGS. 1A, 1B-1, and 1B-2 will be described with reference to FIG. 3 and FIG. 4. FIG. 3 and FIG. 4 are timing charts for explaining the example of a driving method for the display device in FIGS. 1A, 1B-1, and 1B-2.

For example, the region formed by a plurality of the display circuits 115 is divided into three display regions. Moreover, as shown in FIG. 3 and FIG. 4, a plurality of display circuits 115 in the first display region is divided into groups of the display circuits 115 in a plurality of rows: a first group of the display circuits 115 (also referred to as display circuits PIX_G(1)) to a fifth group of the display circuits 115 (also referred to as display circuits PIX_G(5)). A plurality of display circuits 115 in the second display region is divided into groups of the display circuits 115 in a plurality of rows: a sixth group of the display circuits 115 (also referred to as display circuits PIX_G(6)) to a tenth group of the display circuits 115 (also referred to as display circuits PIX_G(10)). A plurality of display circuits 115 in the third display region is divided into groups of the display circuits 115 in a plurality of rows: an eleventh group of the display circuits 115 (also referred to as display circuits PIX_G(11)) to a fifteenth group of the display circuits 115 (also referred to as display circuits PIX_G(15)). Note that the number of rows of the display circuits 115 in each group is not limited to five.

In addition, the input operation and the light-emitting operation are repeated Z times.

In the input operation, in each display region, the display circuits 115 in each group are brought into a writing state (a state wt) sequentially from the display circuits 115 in the first group. At this time, in each group, the display circuits 115 are sequentially brought into a writing state every row sequentially from the display circuits 115 in the first row, and then the display circuits 115 are brought into a display state (a state hld) corresponding to the input display data. Further, the light-emitting diode groups are set to be unlighted state (also referred to as a state off) as appropriate, and the light is not emitted from the LED chips 121 to the display circuit on which the writing operation is performed.

Moreover, in the light-emitting operation, in each of the first to third display regions, among at least one of a red light-emitting diode, a green light-emitting diode, and a blue light-emitting diode of light-emitting diode groups in the LED chips 121 in different rows, light-emitting diodes exhibiting light of different colors in each of the first to third display regions emit light every time the display circuits 115 in each group are brought into a writing state. Then, the light is delivered from the light unit 114 through the light guide member 132 to display circuits 115 of a group to which display data is input.

In K-th light-emitting operation (K is a natural number of 2 or more and Z or less), the light-emitting diode which emits light of a color which is different from that in (K−1)-th light-emitting operation emits light in each of the first to third display regions.

For example, as shown in FIG. 3, light-emitting operation may be performed as follows. In each input operation, in the first display region, the light-emitting diodes in the light-emitting diode group in each row are made emit red light, green light, and blue light in this order. In the second display region, the light-emitting diodes in the light-emitting diode group in each row are made emit blue light, red light, and green light in this order. In the third display region, the light-emitting diodes in the light-emitting diode group in each row are made emit green light, blue light, and red light in this order.

In addition, as partly shown in FIG. 4, light-emitting operation may be performed as follows. In each input operation, in the first display region, the light-emitting diodes in the light-emitting diode group in each row emit light in order of red light, green light, blue light, red light and green light, green light and blue light, and blue light and red light in this order. In the second display region, the light-emitting diodes in the light-emitting diode group in each row emit light in order of blue light and red light, red light, green light, blue light, red light and green light, and green light and blue light in this order. In the third display region, the light-emitting diodes in the light-emitting diode group in each row emit light in order of green light and blue light, blue light and red light, red light, green light, blue light, and red light and green light in this order.

As shown in FIGS. 1A, 1B-1 and 1B-2, FIGS. 2A-1 and 2A-2, FIG. 3, and FIG. 4, the display device in one example of this embodiment includes a plurality of display circuits and a light unit, has a light-emitting diode group in which the light units are arranged in plural rows and a light guide plate formed using a plurality of light guide members. In the display device, light from the light-emitting diodes in each row is emitted to the display circuit via different light guide members.

With the above structure, a diffusing direction of light from a light-emitting diode group can be controlled so that light from a light-emitting diode group in a given row can be prevented from being emitted to display circuits in a plurality of groups including the display circuits of the plural rows. Therefore, degradation in the image quality of a display image can be suppressed. Further, with the above structure, even when there is variation in luminance of a plurality of light-emitting diodes of the same color, degradation in the image quality of a display image can be suppressed in the same manner. Furthermore, the above structure does not need insertion of a black image, for example; consequently, the luminance of display image can be increased.

Moreover, in one example of a display device in this embodiment, input operation and light-emitting operation are repeated Z times. In the input operation, pulses of display selection signals are sequentially input to the display circuits in different rows in each of the plurality of display regions including display circuits in one or more rows and light-emitting diode groups in one or more rows. In the light-emitting operation, among one or more of a red light-emitting diode, a green light-emitting diode and a blue light-emitting diode, light-emitting diodes which exhibit light of different colors emit light in the plurality of display regions every time a pulse of a display selection signal to the display circuits in at least one row in each of the plurality of display regions. Then, in K-th light-emitting operation, the light-emitting diode which shows colors which is different from (K−1)-th light-emitting operation emits light in each of the plurality of display regions.

Even in the case where the above structure is employed, a diffusing direction of light from a light-emitting diode group can be controlled; therefore even in the case where the display region is divided into plural regions and operated, stripes can be suppressed.

With the above structure, since operation of writing data of the display data signal to the display circuits can be performed concurrently on the plurality of groups, time of writing data for all the display circuits can be shortened. Thus, it is easy to increase the number of writing operations of display data and reduce color breakup.

Moreover, with the above structure, while light is emitted to a display circuit of a given group, data of a display data signal can be written to a display circuit of another group, so that the minimum operation time required can be shortened. Thus, it is easy to increase the number of writing operations of display data and reduce color breakup.

According to the above, the image quality of a display image can be increased.

Embodiment 2

In this embodiment, an example of a shift register included in a display driver circuit in the display device of Embodiment 1 will be described. Note that the shift register described in this embodiment is just an example, and a shift register applicable to the display driver circuit is not limited to the shift register described in this embodiment. A shift register with a different structure and a circuit other than the shift register (e.g., a decoder) can be applied to the display driver circuit in the display device of Embodiment 1.

An example of a shift register of this embodiment includes plural stages of sequential circuits consisting of a plurality of sequential circuits (also referred to as FFs).

Figure 5A:
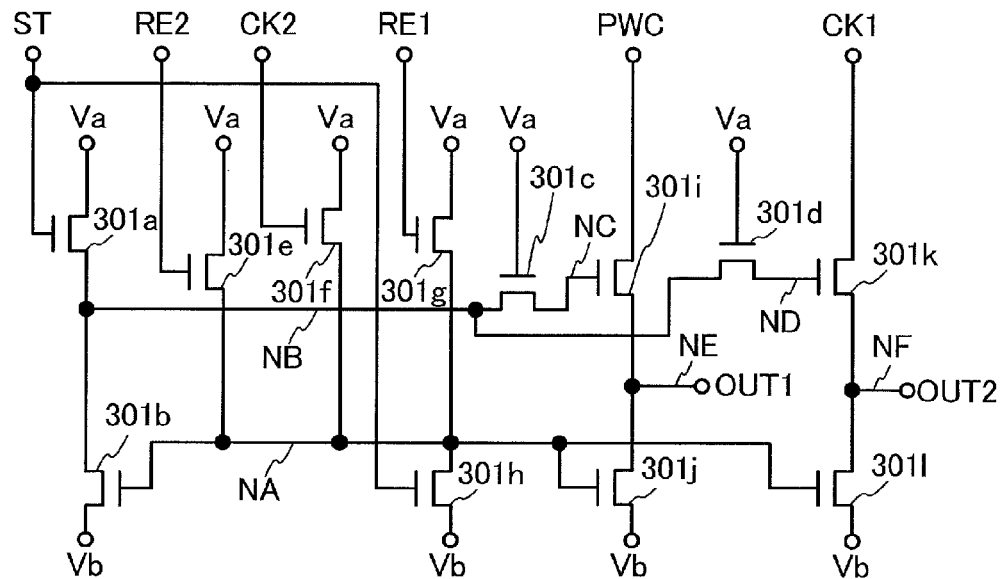
FIGS. 5A and 5B are diagrams explaining an example of a sequential circuit in a shift register in Embodiment 2.
Figure 5B:
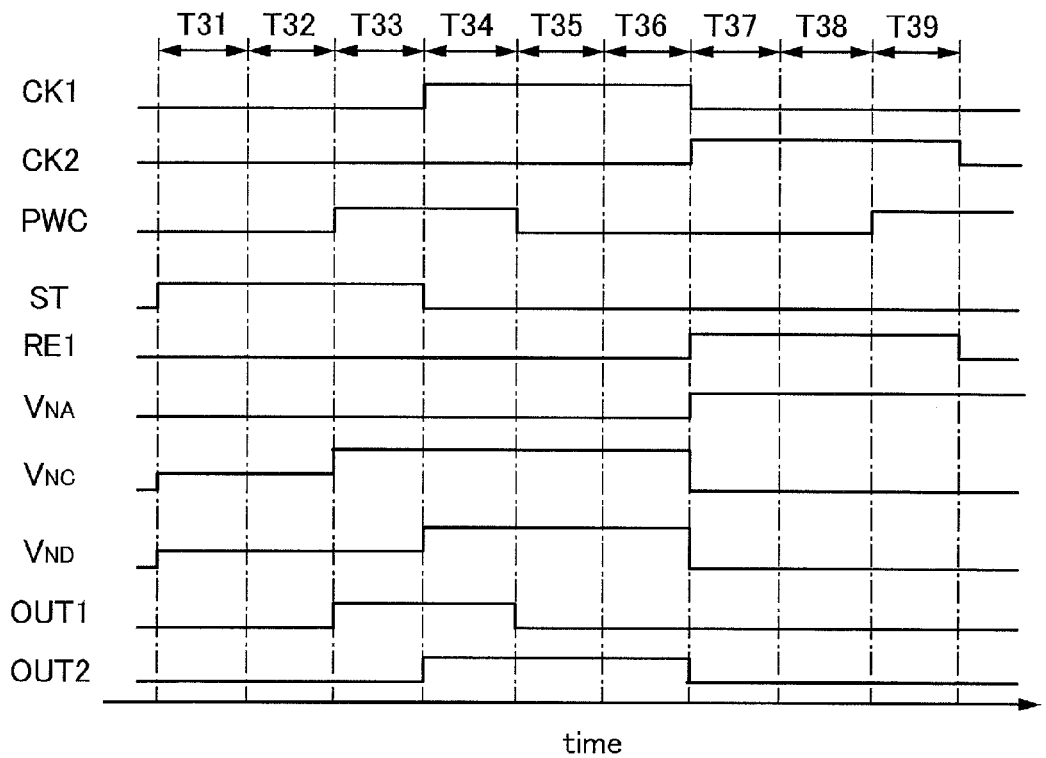

Each of the plurality of sequential circuits will be described with reference to FIGS. 5A and 5B. FIGS. 5A and 5B are diagrams for describing an example of the sequential circuit in the shift register of this embodiment.

First, a configuration example of a sequential circuit of this embodiment will be described with reference to FIG. 5A. FIG. 5A is a circuit diagram illustrating the configuration example of the sequential circuit.

To the sequential circuit illustrated in FIG. 5A, a set signal ST (also refer to as a signal ST), a reset signal RE1 (also refer to as a signal RE1), a reset signal RE2 (also refer to as a signal RE2), a clock signal CK1 (also refer to as a signal CK1), a clock signal CK2 (also refer to as a signal CK2), and a pulse width control signal PWC (also refer to as a signal PWC) are input. In addition, the sequential circuit outputs a signal OUT1 and a signal OUT2.

Note that a pulse width of the pulse width control signal PWC is shorter than a pulse width of the clock signal CK1 or the clock signal CK2.

The reset signal RE2 is a signal which makes the sequential circuit a reset state before a pulse signal of each output signal is output every unit period, for example.

The sequential circuit illustrated in FIG. 5A includes a transistor 301a, a transistor 301b, a transistor 301c, a transistor 301d, a transistor 301e, a transistor 301f, a transistor 301g, a transistor 301h, a transistor 301i, a transistor 301j, a transistor 301k, and a transistor 301l.

Note that in the sequential circuit illustrated in FIG. 5A, each of the transistors 301a to 301l is a field-effect transistor.

A voltage Va is input to one of a source and a drain of the transistor 301a, and the signal ST is input to a gate of the transistor 301a.

One of a source and a drain of the transistor 301b is connected to the other of the source and the drain of the transistor 301a, and a voltage Vb is input to the other of the source and the drain of the transistor 301b.

One of a source and a drain of the transistor 301c is connected to the other of the source and the drain of the transistor 301a, and the voltage Va is input to a gate of the transistor 301c.

One of a source and a drain of the transistor 301d is connected to the other of the source and the drain of the transistor 301a, and the voltage Va is input to a gate of the transistor 301d.

The voltage Va is input to one of a source and a drain of the transistor 301e, the other of the source and the drain of the transistor 301e is connected to a gate of the transistor 301b, and the signal RE2 is input to a gate of the transistor 301e.

The voltage Va is input to one of a source and a drain of the transistor 301f, the other of the source and the drain of the transistor 301f is connected to the gate of the transistor 301b, and the signal CK2 is input to a gate of the transistor 301f.

The voltage Va is input to one of a source and a drain of the transistor 301g, the other of the source and the drain of the transistor 301g is connected to the gate of the transistor 301b, and the signal RE1 is input to a gate of the transistor 301g.

One of a source and a drain of the transistor 301h is connected to the other of the source and the drain of the transistor 301g, the voltage Vb is input to the other of the source and the drain of the transistor 301h, and the set signal ST is input to a gate of the transistor 301h.

The signal PWC is input to one of a source and a drain of the transistor 301i, and a gate of the transistor 301i is connected to the other of the source and the drain of the transistor 301c.

One of a source and a drain of the transistor 301j is connected to the other of the source and the drain of the transistor 301i, the voltage Vb is input to the other of the source and the drain of the transistor 301j, and a gate of the transistor 301j is connected to the gate of the transistor 301b.

The signal CK1 is input to one of a source and a drain of the transistor 301k, and a gate of the transistor 301k is connected to the other of the source and the drain of the transistor 301d.

One of a source and a drain of the transistor 301l is connected to the other of the source and the drain of the transistor 301k, the voltage Vb is input to the other of the source and the drain of the transistor 301l, and a gate of the transistor 301l is connected to the gate of the transistor 301b.

Note that one of the voltage Va and the voltage Vb is a high power supply voltage Vdd, and the other is a low power supply voltage Vss. The high power supply voltage Vdd is a voltage the value of which is relatively higher than that of the low power supply voltage Vss. The low power supply voltage Vss is a voltage the value of which is relatively lower than that of the high power supply voltage Vdd. The value of the voltage Va and the value of the voltage Vb might interchange depending, for example, on the conductivity type of the transistor or the like. The difference between the voltage Va and the voltage Vb is a power supply voltage.

In FIG. 5A, a portion where the gate of the transistor 301b, the other of the source and the drain of the transistor 301e, the other of the source and the drain of the transistor 301f, the one of the source and the drain of the transistor 301h, the gate of the transistor 301j, and the gate of the transistor 301l are connected to each other is referred to as a node NA.

In addition, a portion where the other of the source and the drain of the transistor 301a, the one of the source and the drain of the transistor 301b, the one of the source and the drain of the transistor 301c, and the one of the source and the drain of the transistor 301d are connected to each other is referred to as a node NB.

A portion where the other of the source and the drain of the transistor 301*c* and the gate of the transistor 301*i* are connected to each other is referred to as a node NC.

A portion where the other of the source and the drain of the transistor 301*d* and the gate of the transistor 301*k* are connected to each other is referred to as a node ND.

A portion where the other of the source and the drain of the transistor 301*i* and the one of the source and the drain of the transistor 301*j* are connected to each other is referred to as a node NE.

A portion where the other of the source and the drain of the transistor 301*k* and the one of the source and the drain of the transistor 301*l* are connected to each other is referred to as a node NF.

Note that in the sequential circuit in the shift register of this embodiment, the transistor 301*c* is not necessarily provided; however, with the transistor 301*c*, voltage at the node NB can be prevented from increasing to a voltage higher than the high power supply voltage Vdd when the voltage Va is a high power supply voltage Vdd.

Note that in the sequential circuit in the shift register of this embodiment, the transistor 301*d* is not necessarily provided; however, with the transistor 301*d*, voltage at the node NB can be prevented from increasing to a voltage higher than the high power supply voltage Vdd when the voltage Va is a high power supply voltage Vdd.

An example of operation of the sequential circuit illustrated in FIG. 5A will be described with reference to FIG. 5B. FIG. 5B is a timing chart for describing the example of the operation of the sequential circuit in FIG. 5A. For example, the transistors 301*a* to 301*l* in the sequential circuit in FIG. 5A are all n-type conductivity, the threshold voltages of the transistor 301*i* and the transistor 301*k* are the same voltage Vth, and the high power supply voltage Vdd and the low power supply voltage Vss are input as the voltage Va and the voltage Vb, respectively. The duty ratio of each of the clock signal CK1 and the clock signal CK2 is 25%, the duty ratio of the signal PWC is 33%, and the pulse width of each of the clock signal CK1 and the clock signal CK2 is 1.5 times as large as the pulse width of the signal PWC.

To the sequential circuit illustrated in FIG. 5A, a pulse of the signal ST is input during periods T31 to T33, so that the sequential circuit is in a set state.

For example, in the period T31, the transistor 301*h* is turned on, so that a voltage of the node NA becomes equivalent to the value of the voltage Vb, and the transistor 301*j* and the transistor 301*l* are turned off.

Further, during the period T31, the transistor 301*a*, the transistor 301*c*, and the transistor 301*d* are turned on, and the transistor 301*b* is turned off, so that the voltage of the node NB is increased to the value equivalent to the voltage Va, and then, the transistor 301*a* is turned off.

During the period T33 and a period T34, a pulse of the signal PWC is input. In the period T33, with capacitive coupling due to parasitic capacitance generated between the gate of the transistor 301*i* and the other of the source and the drain thereof, the voltage of the node NC is increased to a value which is higher than the sum of the voltage Va and the voltage Vth, i.e., Va+Vth+Vx (Vx is a given positive value), so that the transistor 301*i* is turned on. The sequential circuit illustrated in FIG. 5A, accordingly, outputs a pulse of the signal OUT1 in accordance with the voltage of the node NE during the period T33 and the period T34.

During the periods T34 to T36, the signal CK1 is set to a high level. In the period T34, with capacitive coupling due to parasitic capacitance generated between the gate of the transistor 301*k* and the other of the source and the drain thereof, the voltage of the node ND is increased to a value which is higher than the sum of the voltage Va and the voltage Vth, i.e., Va+Vth+Vx, so that the transistor 301*k* is turned on. The sequential circuit illustrated in FIG. 5A, accordingly, outputs a pulse of the signal OUT2 in accordance with the voltage of the node NF during the periods T34 to T36.

After that, the sequential circuit illustrated in FIG. 5A is in a reset state by input of a pulse of the signal RE1 during periods T37 to T39. In the period T37, for example, the transistor 301*g* is turned on, whereby the voltage of the node NA becomes a value equivalent to that of the voltage Va, and then the transistor 301*j* and the transistor 301*l* are turned on. During the periods T37 to T39, the signal CK2 is set to a high level. In the period T37, the transistor 301*f* is turned on, whereby each of the voltages of the node NC and the node ND becomes a value equivalent to that of the voltage Vb, and then the transistor 301*i* and the transistor 301*j* are turned off. Thus, during the periods T37 to T39, the signal OUT1 and the signal OUT2 are set to a low level. That is an example of the operation of the sequential circuit illustrated in FIG. 5A.

As described with reference to FIG. 5B, the sequential circuit illustrated in FIG. 5A is set to be in a set state by input of a pulse of the set signal, and then pulses of the signal OUT1 and the signal OUT2 are output. When a pulse of the reset signal is input, the sequential circuit is in a reset state, and then the signal OUT1 and the signal OUT2 are set to a low level.

Figure 6A:
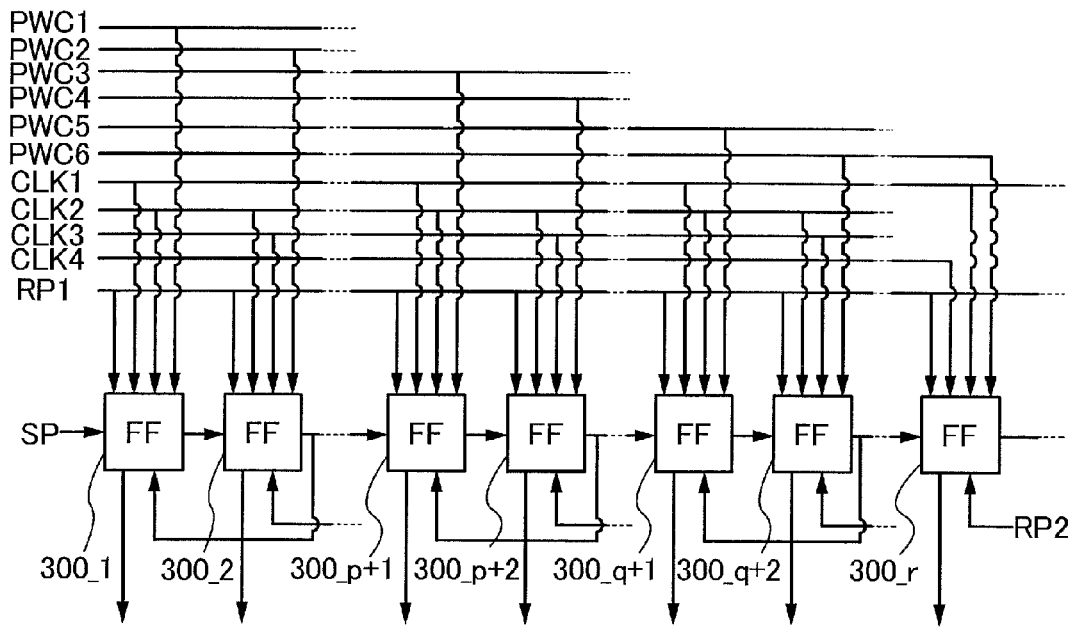
FIGS. 6A and 6B are diagrams explaining an example of a shift register in Embodiment 2.
Figure 6B:
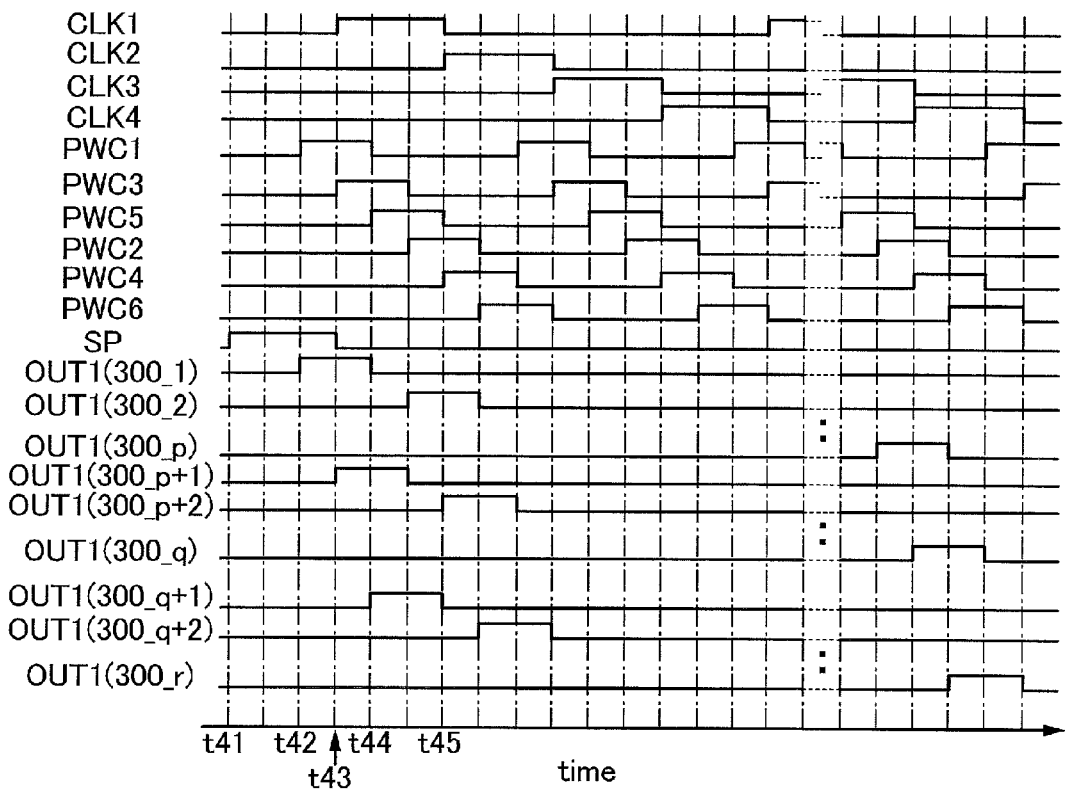

Moreover, an example of a shift register including the sequential circuit illustrated in FIG. 5A will be described with reference to FIGS. 6A and 6B. FIGS. 6A and 6B are diagrams for describing the shift register in this embodiment.

First, a structural example of the shift register including the sequential circuit illustrated in FIG. 5A will be described with reference to FIG. 6A. FIG. 6A is a block diagram illustrating a structural example of the shift register in this embodiment.

The shift register illustrated in FIG. 6A includes sequential circuits of r stages (r is a natural number of 9 or more) formed using r sequential circuits (sequential circuits 300_1 to 300_*r*) described with reference to FIG. 5A.

To the shift register illustrated in FIG. 6A, a start pulse signal SP (also refer to as a signal SP), a clock signal CLK1 (also refer to as a signal CLK1) to a clock signal CLK4 (also refer to as a signal CLK4), a pulse width control signal PWC1 (also refer to as a signal PWC1) to a pulse width control signal PWC6 (also refer to as a signal PWC6), and a reset pulse signal RP1 (also refer to as a signal RP1) are input.

The duty ratio of each of the signal CLK1 to the signal CLK4 is 25%, and the signal CLK1 to the signal CLK4 are sequentially delayed by a quarter of one cycle period.

Note that as a signal CK1 and a signal CK2 in each sequential circuit, any two of the clock signals CLK1 to CLK4 can be used. The clock signals of the same combination are not input to the sequential circuits adjacent to each other, and the input two clock signals are delayed by a quarter of one cycle period. By using the plurality of clock signals, the speed of a signal output operation of the shift register can be increased.

Each of the pulse width control signal PWC1 to the pulse width control signal PWC6 is a pulse signal and has a duty ratio of 33%. The pulse width control signal PWC1 to the pulse width control signal PWC6 are sequentially delayed by a sixth of one cycle period.

Note that as a signal PWC in each sequential circuit, any one of the pulse width control signals PWC1 to PWC6 can be used. Different pulse width control signals are input to the sequential circuits adjacent to each other. Further, pulse width control signals input to the r sequential circuits vary between a plurality of groups each including sequential circuits of a plurality of successive stages. With the use of a plurality of pulse width control signals, a pulse of an output signal can be controlled in each sequential circuit of a plurality of successive stages.

For example, as shown in FIG. 6A, in a sequential circuit 300_1 of a first stage to a sequential circuit 300_p of a p-th stage (p is a natural number of 3 or more and less than r−6), the signal PWC1 is input to the sequential circuits of odd-numbered stages, and the signal PWC2 is input to the sequential circuits of even-numbered stages. In a sequential circuit 300_p+1 of a (p+1)-th stage to a sequential circuit 300_q of a q-th stage (q is a natural number of p+3 or more and r−3 or less), the signal PWC3 is input to the sequential circuits of odd-numbered stages, and the signal PWC4 is input to the sequential circuits of even-numbered stages. In a sequential circuit 300_q+1 of a (q+1)-th stage to a sequential circuit 300_r of an r-th stage, the signal PWC5 is input to the sequential circuits of odd-numbered stages, and the signal PWC6 is input to the sequential circuits of even-numbered stages.

Further, the signal SP is input as the signal ST to the gate of the transistor 301a and the gate of the transistor 301h in the first sequential circuit 300_1.

The gate of the transistor 301a and the gate of the transistor 301h in a sequential circuit 300_H+1 (H is a natural number of r−2 or less) of an (H+1)-th stage are connected to the other of the source and the drain of the transistor 301i in a sequential circuit 300_H of an H-th stage. At this time, the signal OUT2 in the sequential circuit 300_H is the signal ST in the sequential circuit 300_H+1.

The other of the source and the drain of the transistor 301i in the sequential circuit 300_H+1 is connected to the gate of the transistor 301g in the sequential circuit 300_H. At that time, the signal OUT2 in the sequential circuit 300_H+1 is the signal RE1 in the sequential circuit 300_H.

Further, a reset pulse signal RP2 (also refer to as a signal RP2) is input as the signal RE1 to the gate of the transistor 301g in the sequential circuit 300_r of the r-th stage. For example, a sequential circuit with the structure illustrated in FIG. 5A is provided as a dummy sequential circuit, and the signal OUT2 in the dummy sequential circuit can be used as the signal RP2.

In addition, an example of a driving method of the shift register in FIG. 6A is described with reference to FIG. 6B. FIG. 6B is a timing chart for describing an example of a driving method of the shift register in FIG. 6A. Here, the pulse width of each of the signal CLK1 to the signal CLK6 is 1.5 times as large as the pulse width of each of the signal PWC1 to the signal PWC6, as an example.

As operation of the shift register illustrated in FIG. 6A, pulses of the signal OUT1 and the signal OUT2 are sequentially output from the sequential circuits (sequential circuits 300_1 to 300_r) in accordance with the signals CLK1 to the signal CLK4, the signal PWC1 to the signal PWC2, and the signal SP. For example, during a period from time t41 to time t43, a pulse of the signal SP is input to the sequential circuit 300_1; during a period from time t42 to time t44, a pulse of the signal PWC1 is generated; and during a period from the time t43 to time t45, a pulse of the signal CLK1 is generated. As a result, during a period from the time t42 to the time t44, the sequential circuit 300_1 outputs a pulse of the signal OUT1. Note that before a pulse of the signal SP is input, a pulse of the signal RP1 may be input to each sequential circuit, whereby each sequential circuit may be set to be in a reset state.

As described with reference to FIGS. 5A and 5B and FIGS. 6A and 6B, the shift register of this embodiment includes the sequential circuits of the plurality of stages. Each of the plurality of sequential circuits includes a first transistor, a second transistor, and a third transistor. The first transistor has a gate to which a set signal is input and a function of controlling whether to turn on the second transistor in accordance with the set signal. The second transistor has a source and a drain one of which is supplied with a pulse control signal and a function of controlling whether to set the voltage of an output signal from the sequential circuit to a value corresponding to the voltage of the pulse control signal. The third transistor has a gate to which a reset signal is input and a function of controlling whether to turn off the second transistor in accordance with the reset signal.

Moreover, the shift register of this embodiment can be used for the display driver circuit in the display device of the above embodiment. With the above structure, for example, a pulse of a signal SP is generated plural times in one unit period, whereby a pixel portion is divided into display regions constituted by display circuits in plural rows, and pulses of the sequential display selection signals can be output sequentially in each display region. Thus, even in the case where pulses of the sequential display selection signals are output in each display region, stripes generated at boundaries of the display regions due to divisions can be suppressed, and the image quality of a display image can be further improved.

The operation of the display selection signal output circuit is not limited to generation of a pulse of the signal SP plural times in one unit period. For example, a plurality of shift registers having the above structure are provided in the display driver circuit, and pulses are generated from different shift registers in each display region including the display circuits in plural rows, whereby the display selection signal output circuit can output pulses of the sequential display selection signals sequentially in each display region including the display circuits in the plural rows.

In the case where the display data signal output circuit in the display device in the above embodiment includes a shift register, with use of the shift register of this embodiment, the display driver circuit in the display device in the above embodiment can be formed.

Embodiment 3

In this embodiment, an example of a display circuit in the display device described in the above embodiments will be described.

Figure 7A:
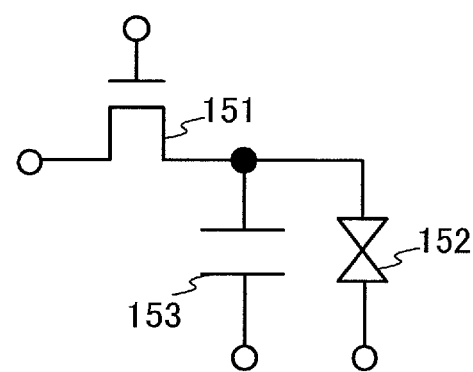
FIGS. 7A and 7B are diagrams explaining an example of a display circuit in Embodiment 3.
Figure 7B:
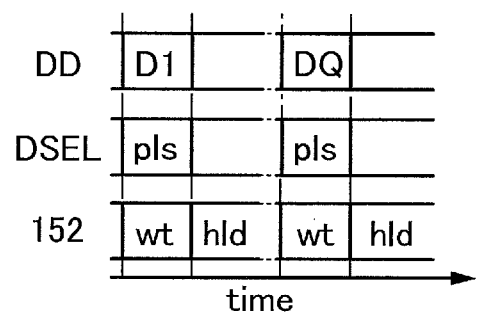

An example of the display circuit in this embodiment will be described with reference to FIGS. 7A and 7B. FIGS. 7A and 7B are diagrams for describing an example of the display circuit in this embodiment.

First, a configuration example of the display circuit in this embodiment is described with reference to FIG. 7A. FIG. 7A illustrates the configuration example of the display circuit in this embodiment.

The display circuit illustrated in FIG. 7A includes a transistor 151, a liquid crystal element 152, and a capacitor 153.

In the display circuit in FIG. 7A, the transistor 151 is a field-effect transistor.

In the display device, a liquid crystal element includes a first display electrode, a second display electrode, and a liquid crystal layer. The light transmittance of the liquid crystal element changes in accordance with a voltage applied between the first display electrode and the second display electrode.

Further, in the display device, the capacitor includes a first capacitor electrode, a second capacitor electrode, and a dielectric layer overlapping with the first capacitor electrode and the second capacitor electrode. The capacitor accumulates electric charge in accordance with a voltage applied between the first capacitor electrode and the second capacitor electrode.

A signal DD is input to one of a source and a drain of the transistor 151, and a signal DSEL is input to a gate of the transistor 151.

The first display electrode of the liquid crystal element 152 is electrically connected to the other of the source and the drain of the transistor 151. A voltage Vc is input to the second display electrode of the liquid crystal element 152. The value of the voltage Vc can be set as appropriate.

The first capacitor electrode of the capacitor 153 is electrically connected to the other of the source and the drain of the transistor 151. The voltage Vc is input to the second capacitor electrode of the capacitor 153.

Next, each component of the display circuit illustrated in FIG. 7A is described.

The transistor 151 has a function as a display selection transistor.

As the liquid crystal element 152, a liquid crystal element that transmits light when the voltage applied between the first display electrode and the second display electrode is 0 V can be used. For example, it is possible to use a liquid crystal element including electrically controlled birefringence liquid crystal (also refer to as ECB liquid crystal), liquid crystal to which dichroic dye is added (also refer to as GH liquid crystal), polymer-dispersed liquid crystal, or discotic liquid crystal. Alternatively, a liquid crystal layer exhibiting a blue phase may be used. The liquid crystal layer exhibiting a blue phase contains, for example, a liquid crystal composition including a liquid crystal exhibiting a blue phase and a chiral agent. The liquid crystal exhibiting a blue phase has a short response time of 1 msec or less, and is optically isotropic; thus, alignment treatment is not necessary and viewing angle dependence is small. Therefore, with the liquid crystal exhibiting a blue phase, the operation speed can be increased. For example, the field-sequential display device in the above embodiments needs to have higher operation speed than a display device using a color filter, and therefore, it is preferable that the above-described liquid crystal exhibiting a blue phase be used in the liquid crystal element in the field-sequential display device in this embodiment.

The capacitor 153 serves as a storage capacitor; a voltage corresponding to the signal DD is applied between the first capacitor electrode and the second capacitor electrode in accordance with the transistor 151. The capacitor 153 is not necessarily provided; however, in the case where the capacitor 153 is provided, variations in voltage applied to the liquid crystal element, due to leakage current of the display selection transistor, can be suppressed.

As the transistor 151, for example, it is possible to use a transistor including a semiconductor layer containing a semiconductor belonging to Group 14 of the periodic table (e.g., silicon) or an oxide semiconductor layer, as a layer in which a channel is formed.

Next, an example of a driving method of the display circuit in FIG. 7A is described.

First, an example of a driving method of the display circuit in FIG. 7A is described with reference to FIG. 7B. FIG. 7B is a timing chart for explaining the example of the driving method of the display circuit in FIG. 7A, which shows states of the signal DD and the signal DSEL.

In the example of the driving method of the display circuit in FIG. 7A, the transistor 151 is turned on when a pulse of the signal DSEL (also referred to as pls) is input.

When the transistor 151 is turned on, the signal DD is input to the display circuit, so that the voltage of the first display electrode of the liquid crystal element 152 and the voltage of the first capacitor electrode of the capacitor 153 become equivalent to the voltage of the signal DD.

At this time, the liquid crystal element 152 is put in a writing state and has a light transmittance corresponding to the signal DD, so that the display circuit is put in a display state corresponding to data (each of data D1 to data DQ (Q is a natural number of 2 or more) of the signal DD.

After that, the transistor 151 is turned off, and the liquid crystal element 152 is put in a display state corresponding to the input display data and keeps the voltage applied between the first display electrode and the second display electrode so that the amount of variations from the initial value does not exceed a reference value until a pulse of the next signal DSEL is input.

As described with FIGS. 7A and 7B, the display circuit exemplified in this embodiment includes a display selection transistor and a liquid crystal element. With the above structure, the display circuit can be set in a display state corresponding to a display data signal.

Embodiment 4

In this embodiment, transistors which can be applied to the transistor in the display device described in the above embodiments will be described.

As the transistor in the display device described in the above embodiments, for example, it is possible to use a transistor including a semiconductor layer containing a semiconductor that belongs to Group 14 of the periodic table (e.g., silicon) or an oxide semiconductor layer, as a layer in which a channel is formed. Note that a layer in which a channel is formed is also referred to as a channel formation layer.

The semiconductor layer may be a single crystal semiconductor layer, a polycrystalline semiconductor layer, a microcrystalline semiconductor layer, or an amorphous semiconductor layer.

Further, the above oxide semiconductor layer may include a crystal which is aligned perpendicularly (also referred to as c-axis-alignment) to a surface of the layer, for example. At this time, the oxide semiconductor layer may be stacked layers. For example, by forming an oxide semiconductor film setting a substrate temperature higher than 25° C. and forming an oxide semiconductor layer using the oxide semiconductor film, an oxide semiconductor layer including a crystal which is aligned perpendicularly to a surface of the layer can be formed. By using an oxide semiconductor layer including a crystal which is aligned perpendicularly to a surface of the layer, a variation of electric characteristics of transistors because of light can be suppressed.

As an transistor including an oxide semiconductor layer, which is applicable as a transistor to the display device described in the above embodiments, a transistor including an oxide semiconductor layer that becomes intrinsic (also refer to as i-type) or substantially intrinsic by purification can be used.

Examples of structures of the transistor including the oxide semiconductor layer are described with reference to FIGS. 8A to 8E. FIGS. 8A to 8E are schematic cross-sectional views each illustrating an example of a structure of a transistor in this embodiment.

Figure 8A:
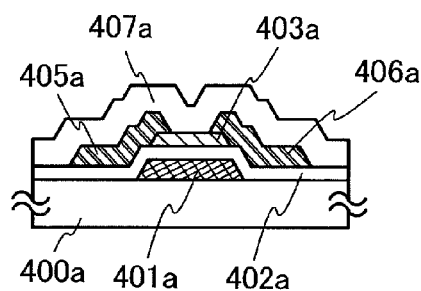
FIGS. 8A to 8E are cross-sectional schematic views each illustrating an example of a structure of a transistor in Embodiment 4.

A transistor illustrated in FIG. 8A is one of bottom-gate transistors, which is also referred to as an inverted staggered transistor.

The transistor illustrated in FIG. 8A includes a conductive layer 401a, an insulating layer 402a, an oxide semiconductor layer 4033a, a conductive layer 405a, and a conductive layer 406a.

The conductive layer 401a is provided over a substrate 400a.

The insulating layer 402a is provided over the conductive layer 401a.

The oxide semiconductor layer 403a overlaps with the conductive layer 401a with the insulating layer 402a interposed therebetween.

The conductive layer 405a and the conductive layer 406a are provided over parts of the oxide semiconductor layer 403a.

Moreover, in the transistor illustrated in FIG. 8A, an insulating layer 407a is in contact with part of a top surface of the oxide semiconductor layer 403a (part of the oxide semiconductor layer 403a over which neither the conductive layer 405a nor the conductive layer 406a is provided).

Further, the insulating layer 407a is provided over the insulating layer 402a with the conductive layer 405a, the conductive layer 406a, and the oxide semiconductor layer 403a interposed therebetween. Furthermore, the insulating layer 407a is in contact with the insulating layer 402a in a portion without the conductive layer 405a, the conductive layer 406a, or the oxide semiconductor layer 403a provided.

Figure 8B:
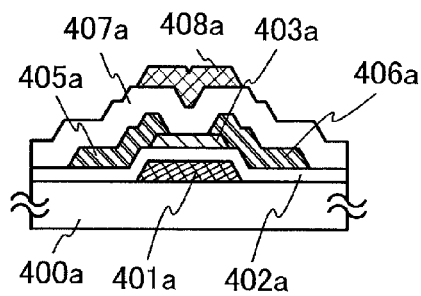

A transistor illustrated in FIG. 8B includes a conductive layer 408a in addition to the structure of FIG. 8A.

The conductive layer 408a overlaps with the oxide semiconductor layer 403a with the insulating layer 407a interposed therebetween.

Figure 8C:
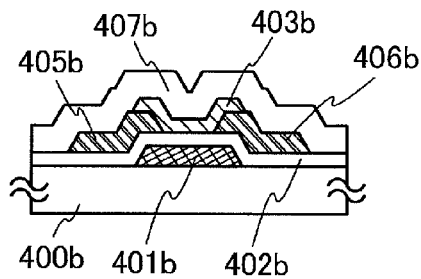

A transistor illustrated in FIG. 8C is one of bottom-gate transistors.

The transistor illustrated in FIG. 8C includes a conductive layer 401b, an insulating layer 402b, an oxide semiconductor layer 403b, a conductive layer 405b, and a conductive layer 406b.

The conductive layer 401b is provided over a substrate 400b.

The insulating layer 402b is provided over the conductive layer 401b.

The conductive layer 405b and the conductive layer 406b are provided over parts of the insulating layer 402b.

The oxide semiconductor layer 403b overlaps with the conductive layer 401b with the insulating layer 402b interposed therebetween.

Moreover, in FIG. 8C, an insulating layer 407b is provided to be in contact with an upper surface and a side surface of the oxide semiconductor layer 403b of the transistor.

Further, the insulating layer 407b is provided over the insulating layer 402b with the conductive layer 405b, the conductive layer 406b, and the oxide semiconductor layer 403b interposed therebetween. Furthermore, the insulating layer 407b is in contact with the insulating layer 402b in a portion without the conductive layer 405b, the conductive layer 406b, and the oxide semiconductor layer 403b provided.

Note that in FIG. 8A, a protective insulating layer may be provided over the insulating layer 407a. Further, in FIG. 8C, a protective insulating layer may be provided over the insulating layer 407b.

Figure 8D:
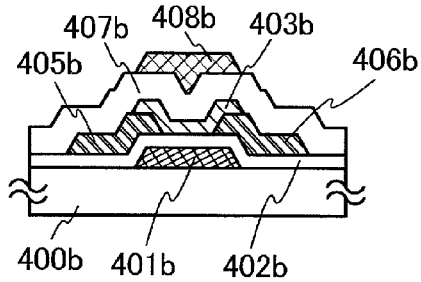

A transistor illustrated in FIG. 8D includes a conductive layer 408b in addition to the structure of FIG. 8C.

The conductive layer 408b overlaps with the oxide semiconductor layer 403b with the insulating layer 407b interposed therebetween.

Figure 8E:
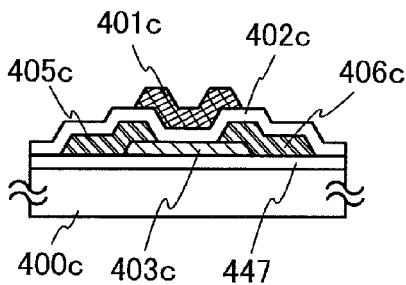

A transistor illustrated in FIG. 8E is one of top-gate transistors.

The transistor illustrated in FIG. 8E includes a conductive layer 401c, an insulating layer 402c, an oxide semiconductor layer 403c, a conductive layer 405c, and a conductive layer 406c.

The oxide semiconductor layer 403c is provided over a substrate 400c with an insulating layer 447 interposed therebetween.

The conductive layer 405c and the conductive layer 406c are provided over the oxide semiconductor layer 403c.

The insulating layer 402c is provided over the oxide semiconductor layer 403c, the conductive layer 405c, and the conductive layer 406c.

The conductive layer 401c overlaps with the oxide semiconductor layer 403c with the insulating layer 402c interposed therebetween.

Further, the components illustrated in FIGS. 8A to 8E are described.

Each of the substrates 400a to 400c can be, for example, a light-transmitting substrate such as a glass substrate or a plastic substrate.

Each of the conductive layers 401a to 401c functions as a gate of the transistor. Note that a layer functioning as a gate of the transistor is also referred to as a gate electrode or a gate wiring.

Each of the conductive layers 401a to 401c can be, for example, a layer of a metal material such as molybdenum, titanium, chromium, tantalum, tungsten, aluminum, copper, neodymium, or scandium; or an alloy material containing any of these materials as a main component. The conductive layers 401a to 401c can also be stacking layers of materials which can be applied to the formation of the conductive layers 401a to 401c.

Each of the insulating layers 402a to 402c functions as a gate insulating layer of the transistor and is also referred to as a gate insulating layer.

As each of the insulating layers 402a to 402c, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a to 402c can also be formed by stacking layers of materials that can be used for the insulating layers 402a to 402c.

Alternatively, as the insulating layers 402a to 402c, an insulating layer including a material containing an oxygen element and an element belonging to Group 13 can be used, for example. In the case where the oxide semiconductor layers 403a to 403c contain an element belonging to Group 13, an insulating layer containing an element belonging to Group 13 is used as an insulating layer which is in contact with the oxide semiconductor layers 403a to 403c, whereby an interface between the insulating layer and the oxide semiconductor layer can have a favorable state.

Examples of the material including an element that belongs to Group 13 and oxygen include gallium oxide, aluminum oxide, aluminum gallium oxide, and gallium aluminum oxide. Note that aluminum gallium oxide refers to a substance in which the amount of aluminum is larger than that of gallium in atomic percent, and gallium aluminum oxide refers to a substance in which the amount of gallium is larger than that of aluminum in atomic percent. As the insulating layers 402a to 402c, a material represented by $Al_2O_x$ ($x=3+\alpha$, where $\alpha$ is larger than 0 and smaller than 1), $Ga_2O_x$ ($x=3+\alpha$, where $\alpha$ is larger than 0 and smaller than 1), or $Ga_xAl_{2-x}O_{3+\alpha}$ (x is larger than 0 and smaller than 2 and α is larger than 0 and smaller than 1) can be used, for example.

For example, an insulating layer containing gallium oxide is used as the insulating layers 402a to 402c, whereby the accumulation amount of hydrogen or hydrogen ions at interfaces between the insulating layers 402a to 402c and the oxide semiconductor layers 403a to 403c can be reduced.

Alternatively, an insulating layer including aluminum oxide is used as the insulating layers 402a to 402c, whereby the accumulation amount of hydrogen or hydrogen ions at interfaces between the insulating layers 402a to 402c and the oxide semiconductor layers 403a to 403c can be reduced. Water does not easily pass through an insulating layer including aluminum oxide. Thus, by using the insulating layer including aluminum oxide, entry of water into the oxide semiconductor layer through the insulating layer can be suppressed.

Further, the insulating layers 402a to 402c can also be stacking layers of materials that can be applied to the insulating layers 402a to 402c. For example, the insulating layers 402a to 402c may be formed by stacking a plurality of different layers which including gallium oxide represented by $Ga_2O_x$. Alternatively, the insulating layers 402a to 402c may be formed by stacking an insulating layer including gallium oxide represented by $Ga_2O_x$ and an insulating layer including aluminum oxide represented by $Al_2O_x$.

The insulating layer 447 serves as a base layer preventing the diffusion of an impurity element coming from the substrate 400c. Note that the insulating layer 447 may be provided for the transistors having the structures illustrated in FIGS. 8A to 8D.

As the insulating layer 447, a layer of a material which can be applied to the insulating layers 402a to 402c can be used, for example. Alternatively, the insulating layer 447 may be formed by stacking layers of materials that can be applied to the insulating layers 402a to 402c.

The oxide semiconductor layers 403a to 403c each function as a layer in which a channel of the transistor is formed. As an oxide semiconductor which can be used for the oxide semiconductor layers 403a to 403c, for example, an In-based oxide, a Sn-based oxide, or a Zn-based oxide can be used. For example, as the above metal oxide, a four-component metal oxide, a three-component metal oxide, a two-component metal oxide, or the like can be given. Note that a metal oxide which can be used as the above oxide semiconductor may include gallium as a stabilizer for reducing variation in characteristics. A metal oxide which can be used as the above oxide semiconductor may include tin as a stabilizer. A metal oxide which can be used as the above oxide semiconductor may include hafnium as a stabilizer. A metal oxide which can be used as the above oxide semiconductor may include aluminum as a stabilizer. A metal oxide which can be used as the above oxide semiconductor may include one or more of following material as a stabilizer: lanthanum, cerium, praseodymium, neodymium, samarium, europium, gadolinium, terbium, dysprosium, holmium, erbium, thulium, ytterbium, and lutetium, which are lanthanoid. Further, the metal oxide that can be used as the oxide semiconductor may contain silicon oxide. For example, as a quaternary metal oxide, an In—Sn—Ga—Zn-based metal oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, or the like can be used. For example, as a three-component metal oxide, an In—Ga—Zn-based oxide (also referred to as IGZO), an In—Sn—Zn-based oxide (also referred to as ITZO), an In—Al—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, or the like can be used. As a two-component metal oxide, for example, an In—Zn-based oxide (also referred to as IZO), a Sn—Zn-based oxide, an Al—Zn-based oxide, a Zn—Mg-based oxide, a Sn—Mg-based oxide, an In—Mg-based oxide, an In—Sn-based oxide, an In—Ga-based oxide, or the like can be used. Further, the metal oxide that can be used as the oxide semiconductor may contain silicon oxide.

In the case of using an In—Zn-based metal oxide, for example, an oxide target which has a composition ratio of In:Zn=50:1 to 1:2 ($In_2O_3$:ZnO=25:1 to 1:4 expressed in a molar ratio), preferably In:Zn=20:1 to 1:1 ($In_2O_3$:ZnO=10:1 to 1:2 expressed in a molar ratio), further preferably In:Zn=15:1 to 1.5:1 ($In_2O_3$:ZnO=15:2 to 3:4 expressed in a molar ratio) can be used for formation of the In—Zn-based metal oxide semiconductor layer. For example, when the atomic ratio of the target used for the deposition of the In—Zn-based oxide semiconductor is expressed by In:Zn:O=S:U:R, R>1.5S+U. An increase in the amount of indium enables mobility of the transistor to increase.

As the oxide semiconductor, a material represented by $InLO_3(ZnO)_m$ (m is larger than 0) can also be used. Here, L in $InLO_3(ZnO)_m$ represents one or more metal elements selected from Ga, Al, Mn, or Co.

The conductive layers 405a to 405c and the conductive layers 406a to 406c function as a source or a drain of the transistor. Note that a layer functioning as a source of the transistor is also referred to as a source electrode or a source wiring, and a layer functioning as a drain of the transistor is also referred to as a drain electrode or a drain wiring.

Each of the conductive layers 405a to 405c and the conductive layers 406a to 406c can be, for example, a layer of a metal material such as aluminum, chromium, copper, tantalum, titanium, molybdenum, or tungsten; or an alloy material containing any of these metal materials as a main component. Alternatively, each of the conductive layers 405a to 405c and the conductive layers 406a to 406c can be stacking layers of materials applicable to the conductive layers 405a to 405c and the conductive layers 406a to 406c.

Alternatively, the conductive layers 405a to 405c and the conductive layers 406a to 406c can be formed using a layer containing conductive metal oxide. Examples of the conductive metal oxide are indium oxide, tin oxide, zinc oxide, an alloy of indium oxide and tin oxide, and an alloy of indium oxide and zinc oxide. Note that the conductive metal oxide applicable to the conductive layers 405a to 405c and the conductive layers 406a to 406c may contain silicon oxide.

Like the insulating layers 402a to 402c, each of the insulating layers 407a and 407b can be an insulating layer including a material containing an oxygen element and an element belonging to Group 13 of the periodic table, for example. Alternatively, for the insulating layers 407a and 407b, for example, a material represented by $Al_2O_x$, $Ga_2O_x$, or $Ga_xAl_{2-x}O_{3+\alpha}$ can be used.

For example, the insulating layers 402a to 402c and the insulating layers 407a and 407b may each be an insulating layer including gallium oxide represented by $Ga_2O_x$. Further, one of the insulating layer (the insulating layers 402a to 402c) and the insulating layer (the insulating layers 407a and 407b) may be an insulating layer including gallium oxide represented by $Ga_2O_x$, and the other of the insulating layer (the insulating layers 402a to 402c) and the insulating layer (the insulating layers 407a and 407b) may be an insulating layer including aluminum oxide represented by $Al_2O_x$.

Each of the conductive layers 408a and 408b functions as a gate of the transistor. When the transistor includes the conductive layer 408a or the conductive layer 408b, one of the conductive layer 401a and the conductive layer 408a or the one of the conductive layer 401b and the conductive layer 408b is also referred to as a back gate, a back-gate electrode, or a back-gate wiring. A plurality of layers functioning as a gate are provided with the channel formation layer interposed therebetween, whereby the threshold voltage of the transistor can be controlled easily.

Each of the conductive layers 408a and 408b can be, for example, a layer of a metal material such as aluminum, chromium, copper, tantalum, titanium, molybdenum, or tungsten; or an alloy material which contains any of the above metal materials as a main component. Each of the conductive layers 408a and 408b can be stacking layers of materials applicable to the conductive layers 408a and 408b.

Alternatively, as the conductive layers 408a and 408b, a layer including conductive metal oxide can be used. Examples of the conductive metal oxide are indium oxide, tin oxide, zinc oxide, an alloy of indium oxide and tin oxide, and an alloy of indium oxide and zinc oxide. Note that the conductive metal oxide applicable to the conductive layers 408a and 408b may contain silicon oxide.

Note that the transistor of this embodiment may have a structure in which an insulating layer is provided over part of the oxide semiconductor layer functioning as a channel formation layer and a conductive layer functioning as a source or a drain is provided to overlap with the oxide semiconductor layer with the insulating layer interposed therebetween. In the above structure, the insulating layer functions as a layer protecting a channel formation layer (also referred to as a channel protective layer) of the transistor. As the insulating layer functioning as a channel protective layer, a layer including a material applicable to the insulating layers 402a to 402c can be used for example. Alternatively, an insulating layer functioning as a channel protective layer may be formed by stacking layers of materials applicable to the insulating layers 402a to 402c.

Note that the transistor in this embodiment does not necessarily have the structure where the entire oxide semiconductor layer overlaps with the conductive layer functioning as a gate electrode, as illustrated in FIGS. 8A to 8E; in the case of employing the structure where the entire oxide semiconductor layer overlaps with the conductive layer functioning as a gate electrode, entry of light into the oxide semiconductor layer can be prevented.

Next, as an example of a method for manufacturing the transistor in this embodiment, an example of a method for manufacturing the transistor illustrated in FIG. 8A will be described with reference to FIGS. 9A to 9E. FIGS. 9A to 9E are schematic cross-sectional views illustrating an example of a method for manufacturing the transistor in FIGS. 8A to 8E.

Figure 9A:
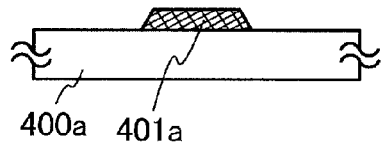
FIGS. 9A to 9E are cross-sectional schematic views explaining an example of a method for manufacturing the transistor in Embodiment 4.

First, as illustrated in FIG. 9A, the substrate 400a is prepared, a first conductive film is formed over the substrate 400a, and part of the first conductive film is etched to form the conductive layer 401a.

For example, the first conductive film can be formed by formation of a film of a material applicable to the conductive layer 401a by sputtering. The first conductive film can be formed by stacking layers of materials that can be used for the first conductive film.

When a high-purity gas from which impurities such as hydrogen, water, a hydroxyl group, or a hydride are removed is used as a sputtering gas, the impurity concentration of a film to be formed can be reduced.

Note that before the film is formed by sputtering, preheat treatment may be performed in a preheating chamber of a sputtering apparatus. By the preheat treatment, impurities such as hydrogen or moisture can be eliminated.

Moreover, before the film is formed by sputtering, it is possible to perform the following treatment (called reverse sputtering): instead of applying a voltage to the target side, an RF power source is used for applying a voltage to the substrate side in an argon, nitrogen, helium, or oxygen atmosphere so that plasma is generated to modify a surface where the film is to be formed. With reverse sputtering, powdery substances (also referred to as particles or dust) attached to the surface where the film is to be formed can be removed.

In the case where the film is formed by sputtering, moisture remaining in a deposition chamber used for forming the film can be removed with an entrapment vacuum pump or the like. As the entrapment vacuum pump, a cryopump, an ion pump, a titanium sublimation pump, or the like can be used, for example. Moreover, moisture remaining in the deposition chamber can be removed with a turbo molecular pump provided with a cold trap.

Like a formation of the above conductive layer 401a, in the case where a layer is formed by etching part of a film in an example of a formation method of the transistor in this embodiment, for example, a resist mask is formed over part of the film by a photolithography step, and the film is etched with use of the resist mask, whereby the layer can be formed. In that case, the resist mask is removed after the layer is formed.

Note that the resist mask may be formed by an inkjet method. A photomask is not used in an inkjet method; thus, manufacturing cost can be reduced. Alternatively, the resist mask may be formed using a light-exposure mask having a plurality of regions with different transmittances (also referred to as a multi-tone mask). With a multi-tone mask, a resist mask having regions with different thicknesses can be formed, and the number of resist masks used for manufacturing the transistor can be reduced.

Figure 9B:
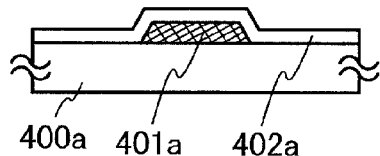

Next, as illustrated in FIG. 9B, the insulating layer 402a is formed by formation of a first insulating film over the conductive layer 401a.

For example, the first insulating film can be formed by formation of a film of a material applicable to the insulating layer 402a by sputtering, plasma CVD, or the like. The first insulating film can also be formed by stacking films of materials that can be used for the insulating layer 402a. Moreover, when a film of a material applicable to the insulating layer 402a is formed by high-density plasma CVD (e.g., high-density plasma CVD using microwaves such as microwave at a frequency of 2.45 GHz), the insulating layer 402a can be dense and have an improved breakdown voltage.

Figure 9C:
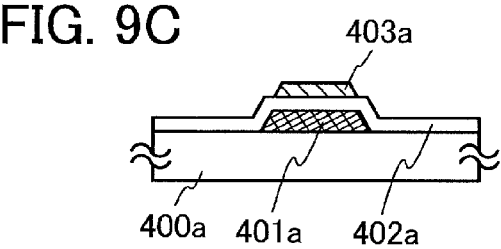

Next, an oxide semiconductor film is formed over the insulating layer 402a and then part of the oxide semiconductor film is etched, whereby the oxide semiconductor layer 403a is formed as illustrated in FIG. 9C.

For example, the oxide semiconductor film can be formed by formation of a film of an oxide semiconductor material applicable to the oxide semiconductor layer 403a by sputtering. Note that the oxide semiconductor film may be formed in a rare gas atmosphere, an oxygen atmosphere, or a mixed atmosphere of a rare gas and oxygen.

The oxide semiconductor film can be formed using an oxide target having a composition ratio of $In_2O_3:Ga_2O_3:ZnO=1:1:1$ [molar ratio] as a sputtering target. Alternatively, the oxide semiconductor film may be formed using an oxide target having a composition ratio of $In_2O_3:Ga_2O_3:ZnO=1:1:2$ [molar ratio] as a sputtering target, for example.

When the oxide semiconductor film is formed by sputtering, the substrate 400a may be placed under reduced pressure and heated at the temperature higher than or equal to 100° C. and lower than or equal to 600° C., preferably higher than or equal to 200° C. and lower than or equal to 400° C. By heating the substrate 400a, the concentration of impurities in the oxide semiconductor film can be reduced and damage to the oxide semiconductor film caused by the sputtering can be reduced.

Figure 9D:
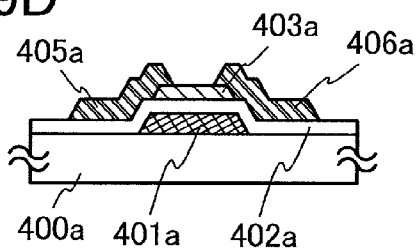

Next, as illustrated in FIG. 9D, a second conductive film is formed over the insulating layer 402a and the oxide semiconductor layer 403a, and part of the second conductive film is etched to form the conductive layers 405a and 406a.

For example, the second conductive film can be formed by formation of a film of a material applicable to the conductive layers 405a and 406a by sputtering or the like. Alternatively, the second conductive film can be formed by stacking films of materials applicable to the conductive layers 405a and 406a.

Figure 9E:
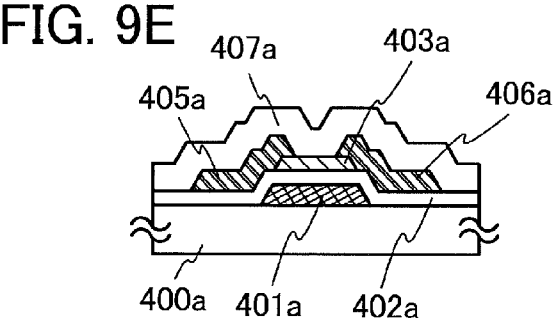

Then, as illustrated in FIG. 9E, the insulating layer 407a is formed so as to be in contact with the oxide semiconductor layer 403a.

For example, the oxide insulating layer 407a can be formed by formation of a film applicable to the insulating layer 407a by sputtering in a rare gas (typically, argon) atmosphere, an oxygen atmosphere, or a mixed atmosphere of a rare gas and oxygen. The insulating layer 407a formed by sputtering can suppress a reduction in resistance of a portion of the oxide semiconductor layer 403a, which serves as a back channel of the transistor. The temperature of the substrate at the time when the insulating layer 407a is formed preferably ranges from room temperature to 300° C.

Before the formation of the insulating layer 407a, plasma treatment using a gas such as $N_2O$, $N_2$, or Ar may be performed to remove water or the like on an exposed surface of the oxide semiconductor layer 403a. In the case of performing the plasma treatment, the insulating layer 407a is preferably formed without exposure to air after the plasma treatment.

Further, in the example of the method for manufacturing the transistor in FIG. 8A, heat treatment is performed, for example, at temperature higher than or equal to 400° C. and lower than or equal to 750° C., or temperature higher than or equal to 400° C. and lower than the strain point of the substrate. For example, the heat treatment is performed after the oxide semiconductor film is formed, after part of the oxide semiconductor film is etched, after the second conductive film is formed, after part of the second conductive film is etched, or after the insulating layer 407a is formed.

A heat treatment apparatus for the heat treatment can be an electric furnace or an apparatus for heating an object by heat conduction or heat radiation from a heating element such as a resistance heating element. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the high-temperature gas, a rare gas or an inert gas (e.g., nitrogen) which does not react with the object by the heat treatment can be used, for example.

Further, after the heat treatment, a high-purity oxygen gas, a high-purity $N_2O$ gas, or ultra-dry air (having a dew point −40° C. or lower, preferably −60° C. or lower) may be introduced in the furnace where the heat treatment has been performed while the heating temperature is being maintained or being decreased. It is preferable that the oxygen gas or the $N_2O$ gas do not contain water, hydrogen, or the like. The purity of the oxygen gas or the $N_2O$ gas which is introduced into the heat treatment apparatus is preferably equal to or more than 6N, further preferably equal to or more than 7N (i.e., the impurity concentration of the oxygen gas or the $N_2O$ gas is preferably equal to or lower than 1 ppm, further preferably equal to or lower than 0.1 ppm). By the action of the oxygen gas or the $N_2O$ gas, oxygen is supplied to the oxide semiconductor layer 403a, so that defects caused by oxygen vacancy in the oxide semiconductor layer 403a can be reduced.

Besides the above heat treatment, heat treatment (preferably at temperature higher than or equal to 200° C. and lower than or equal to 400° C., for example at temperature higher than or equal to 250° C. and lower than or equal to 350° C.) may be performed in an inert gas atmosphere or an oxygen gas atmosphere after the insulating layer 407a is formed.

Oxygen doping using oxygen plasma may be performed after the insulating layer 402a is formed, after the oxide semiconductor film is formed, after the conductive layers functioning as the source electrode and the drain electrode are formed, after the insulating layer is formed, or after the heat treatment is performed. For example, an oxygen doping treatment using high-density plasma of 2.45 GHz may be performed. Alternatively, oxygen doping may be performed with an ion implantation method or ion doping. The oxygen doping can reduce variations in electrical characteristics of transistors to be manufactured. For example, by performing oxygen doping, one of or both the insulating layer 402a and the insulating layer 407a have oxygen having higher proportion than that in the stoichiometric composition. Thus, excessive oxygen in the insulating layer is easily supplied to the oxide semiconductor layer 403a. As a result, an oxygen defect in the oxide semiconductor layer 403a or at an interface between the oxide semiconductor layer 403a and one of or both the insulating layer 402a and the insulating layer 407a can be reduced, which results in further reduction in the carrier concentration in the oxide semiconductor layer 403a.

For example, in the case where an insulating layer including gallium oxide is formed as one of or both the insulating layer 402a and the insulating layer 407a, oxygen is supplied to the insulating layer, so that the composition of gallium oxide can be $Ga_2O_x$.

Alternatively, in the case where an insulating layer including aluminum oxide is formed as one of or both the insulating layer 402a and the insulating layer 407a, oxygen is supplied to the insulating layer, so that the composition of aluminum oxide can be $Al_2O_x$.

Alternatively, in the case where an insulating layer including gallium aluminum oxide or aluminum gallium oxide is formed as one of or both the insulating layer 402a and the insulating layer 407a, oxygen is supplied to the insulating layer, so that the composition of gallium aluminum oxide or aluminum gallium oxide can be $Ga_xAl_{2-x}O_{3+\alpha}$.

Through the above steps, impurities such as hydrogen, water, a hydroxyl group, or a hydride (also referred to as a hydrogen compound) are removed from the oxide semiconductor layer 403a, and in addition, oxygen is supplied to the oxide semiconductor layer 403a, whereby the oxide semiconductor layer can be highly purified.

Although the example of the manufacturing method of the transistor illustrated in FIG. 8A is explained, the manufacturing method of the transistor of the present invention is not limited to the above. For example, if any of the components illustrated in FIGS. 8B to 8E has the same designation as the components in FIG. 8A and has a function, at least part of which is the same as that of the components in FIG. 8A, the description of the example of the manufacturing method of the transistor in FIG. 8A can be employed as appropriate.

As described with FIGS. 8A to 8E and FIGS. 9A to 9E, the transistor exemplified in this embodiment includes a conductive layer functioning as a gate; an insulating layer functioning as a gate insulating layer; an oxide semiconductor layer that overlaps with the conductive layer functioning as the gate with the insulating layer functioning as the gate insulating layer placed therebetween, in which a channel is formed; a conductive layer that is electrically connected to the oxide semiconductor layer and functions as one of a source and a drain; and a conductive layer that is electrically connected to the oxide semiconductor layer and functions as the other of the source and the drain.

Further, in the transistor exemplified in this embodiment, the insulating layer which is in contact with the oxide semiconductor layer and the insulating layer functioning as a gate insulating layer are in contact with each other with the oxide semiconductor layer, the conductive layer functioning as one of a source and a drain, and the conductive layer functioning as the other of the source and the drain interposed therebetween. With the above structure, the oxide semiconductor layer, the conductive layer functioning as one of a source and a drain, and the conductive layer functioning as the other of the source and the drain are surrounded by the insulating layer which is in contact with the oxide semiconductor layer and the insulating layer functioning as a gate insulating layer. Thus, entry of impurities to the oxide semiconductor layer, the conductive layer functioning as one of a source and a drain, and the conductive layer functioning as the other of the source and the drain can be suppressed.

In addition, the concentration of an alkali metal included in the oxide semiconductor layer where a channel is formed is preferably low. For example, when sodium is contained in the oxide semiconductor layer where a channel is formed, the concentration of sodium included in the oxide semiconductor layer where a channel is formed is $5\times10^{16}/cm^3$ or lower, preferably $1\times10^{16}/cm^3$ or lower, more preferably $1\times10^{15}/cm^3$ or lower. Moreover, when lithium is contained in the oxide semiconductor layer where a channel is formed, the concentration of lithium included in the oxide semiconductor layer where a channel is formed is $5\times10^{15}/cm^3$ or lower, preferably $1\times10^{15}/cm^3$ or lower. In addition, when potassium is contained in the oxide semiconductor layer where a channel is formed, the concentration of potassium included in the oxide semiconductor layer where a channel is formed is $5\times10^{15}/cm^3$ or lower, preferably $1\times10^{15}/cm^3$ or lower. For example, in a case where an insulating layer in contact with the oxide semiconductor layer is an oxide, sodium diffuses into the insulating layer of the oxide to cause deterioration of characteristics of a transistor (e.g., shift of threshold voltage, reduction of mobility, or the like). Further, sodium also causes variation of characteristics of plural transistors. Therefore, the reduction of the concentration of an alkali metal contained in the oxide semiconductor layer where a channel is formed leads to suppression of deterioration of characteristics of a transistor due to an alkali metal.

As described above, the oxide semiconductor layer in which a channel is formed is an oxide semiconductor layer that becomes i-type or substantially i-type by purification. By high purification of the oxide semiconductor layer, the carrier concentration of the oxide semiconductor layer can be lower than $1\times10^{14}/cm^3$, preferably lower than $1\times10^{12}/cm^3$, further preferably lower than $1\times10^{11}/cm^3$, and thus, change in characteristics due to temperature change can be suppressed. With the above structure, the off-state current per micrometer of the channel width can be 10 aA ($1\times10^{-17}$ A) or less, 1 aA ($1\times10^{-18}$ A) or less, 10 zA ($1\times10^{-20}$ A) or less, further 1 zA ($1\times10^{-21}$ A) or less, and furthermore 100 yA ($1\times10^{-22}$ A) or less. It is preferable that the off-state current of the transistor be as low as possible. The lowest value of the off-state current of the transistor in this embodiment is estimated to be about $10^{-30}$ A/μm.

The transistor including an oxide semiconductor layer of this embodiment is used for at least one of the display circuit, the display driver circuit, and the display data signal output circuit in the display device of the above embodiments, for example, whereby the reliability of the display device can be improved.

Embodiment 5

In this embodiment, a structural example of the display device described in the above embodiments will be described.

A display device in this embodiment includes a first substrate (an active matrix substrate) where a semiconductor element such as a transistor is provided, a second substrate, and a liquid crystal layer provided between the first substrate and the second substrate.

Figure 10A:
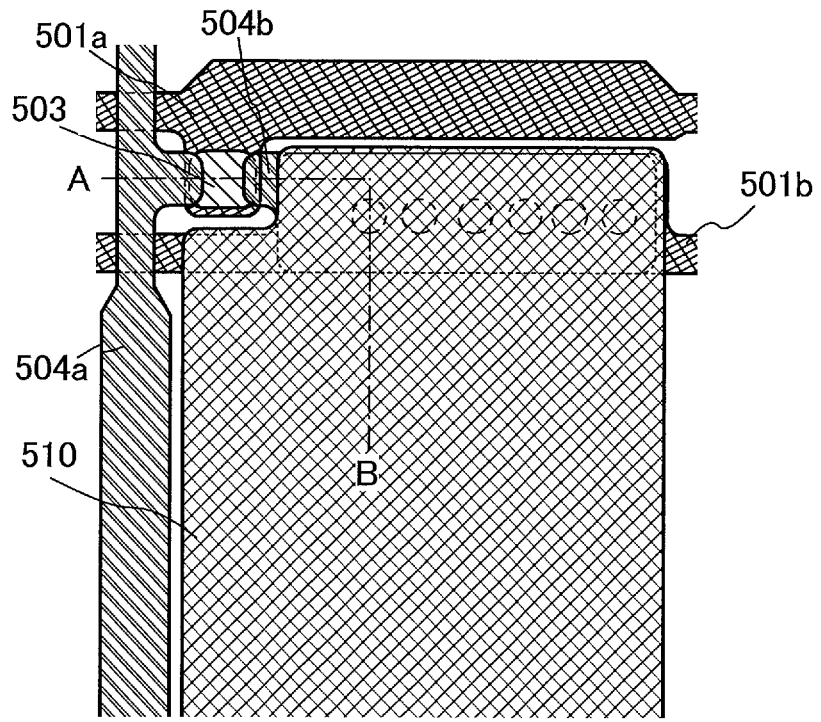
FIGS. 10A and 10B are diagrams illustrating an example of a structure of a display device in Embodiment 5.
Figure 10B:
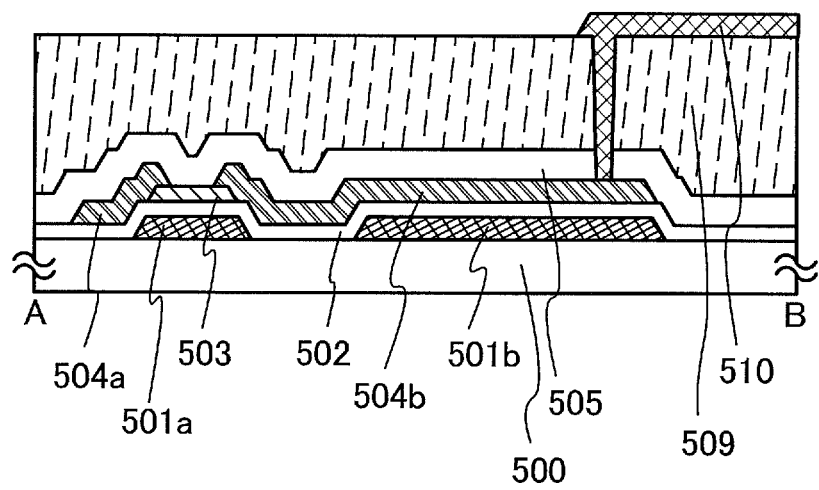

A structural example of the active matrix substrate in the display device of this embodiment is described with reference to FIGS. 10A and 10B. FIGS. 10A and 10B illustrate a structural example of an active matrix substrate in the liquid crystal display device of this embodiment. FIG. 10A is a plan schematic view, and FIG. 10B is a schematic cross-sectional view taken along line A-B in FIG. 10A. In FIGS. 10A and 10B, as an example of the transistor, the transistor having a structure described with FIG. 8A is shown.

The active matrix substrate illustrated in FIGS. 10A and 10B includes a substrate 500, a conductive layer 501a, a conductive layer 501b, an insulating layer 502, a semiconductor layer 503, a conductive layer 504a, a conductive layer 504b, an insulating layer 505, an insulating layer 509, and a conductive layer 510.

Each of the conductive layers 501a and 501b is formed over one surface of the substrate 500.

The conductive layer 501a functions as a gate of a display selection transistor in a display circuit.

The conductive layer 501b functions as a second capacitor electrode of a storage capacitor in the display circuit. Note that the layer functioning as a second capacitor electrode of a capacitor (a storage capacitor) is also referred to as a second capacitor electrode.

The insulating layer 502 is provided over the one surface of the substrate 500 with the conductive layers 501a and 501b placed therebetween.

The insulating layer 502 functions as a gate insulating layer of the display selection transistor in the display circuit and a dielectric layer of the storage capacitor in the display circuit.

The semiconductor layer 503 overlaps with the conductive layer 501a with the insulating layer 502 interposed therebetween. The semiconductor layer 503 functions as a channel formation layer of the display selection transistor in the display circuit.

The conductive layer 504a is electrically connected to the semiconductor layer 503. The conductive layer 504a functions as one of a source and a drain of the display selection transistor in the display circuit.

The conductive layer 504b is electrically connected to the semiconductor layer 503 and overlaps with the conductive layer 501b with the insulating layer 502 interposed therebetween. The conductive layer 504b functions as the other of the source and the drain of the display selection transistor in the display circuit and also functions as a first capacitor electrode of the storage capacitor in the display circuit.

The insulating layer 505 is partly in contact with the semiconductor layer 503 where the conductive layer 504a or the conductive layer 504b is not provided.

The insulating layer 509 overlaps with the insulating layer 505. The insulating layer 509 functions as a planarization insulating layer in the display circuit. Note that the insulating layer 509 is not necessarily provided.

The conductive layer 510 is electrically connected to the conductive layer 504b in an opening portion that penetrates the insulating layers 505 and 509. The conductive layer 510 functions as a pixel electrode of a display element in the display circuit. Note that a layer having a function of a pixel electrode is also referred to as a pixel electrode.

Figure 11A:
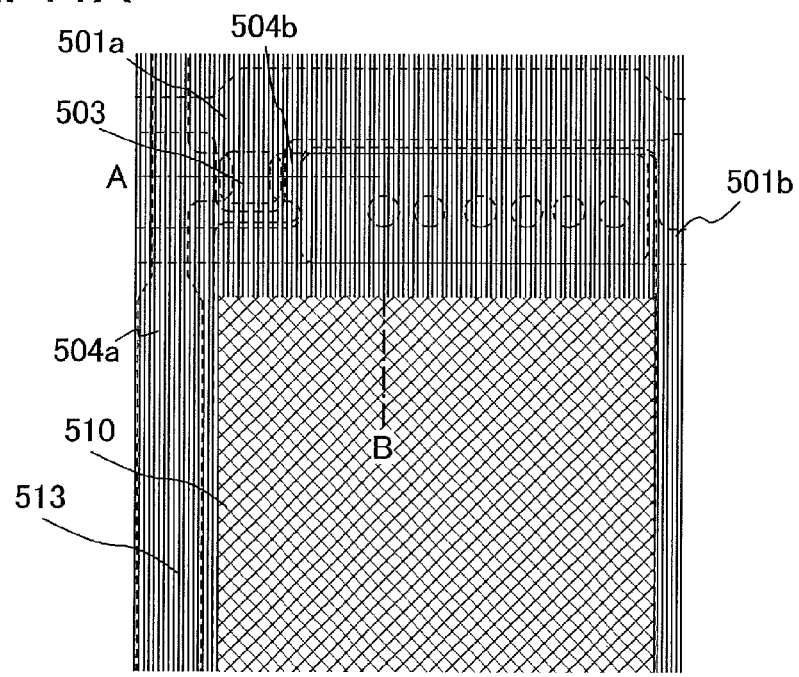
FIGS. 11A and 11B are diagrams illustrating an example of a structure of a display device in Embodiment 5.
Figure 11B:
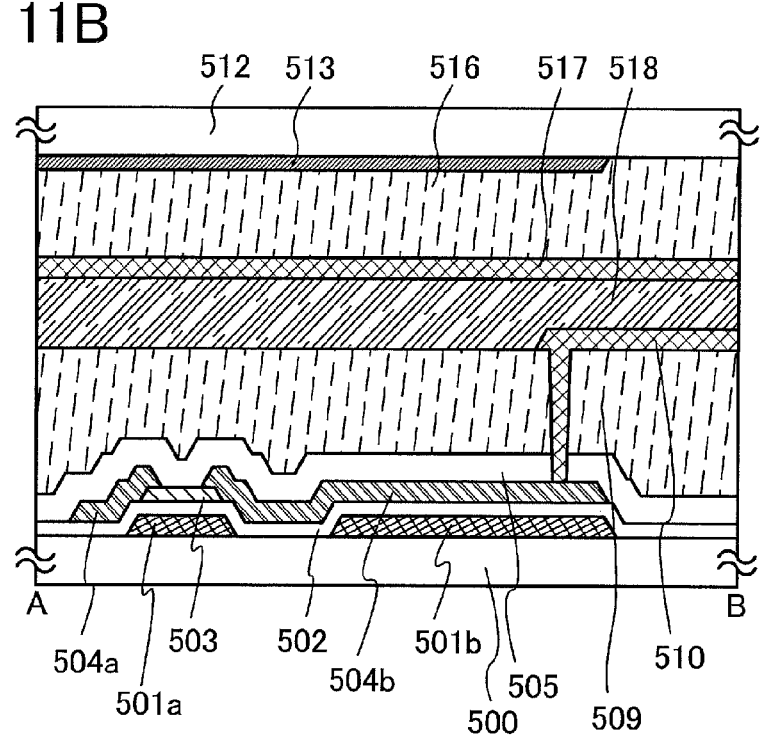

Further, a structural example of a display device in this embodiment is described with reference to FIGS. 11A and 11B. FIGS. 11A and 11B illustrate a structural example of a display device including the active matrix substrate illustrated in FIGS. 10A and 10B. FIG. 11A is a plan schematic view, and FIG. 11B is a schematic cross-sectional view taken along line A-B in FIG. 11A. Note that a liquid crystal element is used as a display element as an example.

The display device illustrated in FIGS. 11A and 11B includes, in addition to the active matrix substrate in FIGS. 10A and 10B, a substrate 512, a light-blocking layer 513, an insulating layer 516, a conductive layer 517, and a liquid crystal layer 518. Note that in FIG. 11A, the conductive layer 517 is omitted for convenience.

The light-blocking layer 513 is provided on part of one surface of the substrate 512. For example, the light-blocking layer 513 is formed on part of the one surface of the substrate 512 on a portion overlapping with the transistor.

The insulating layer 516 is formed on the substrate 512 side so that the light-blocking layer 513 is sandwiched between the insulating layer 516 and the substrate 512.

The conductive layer 517 is provided on the one surface of the substrate 512 side. The conductive layer 517 functions as a common electrode of the display circuits.

The liquid crystal layer 518 is provided between the conductive layer 510 and the conductive layer 517.

The conductive layer 510, the liquid crystal layer 518, and the conductive layer 517 function as a display element in the display circuit.

In addition, components of the display devices illustrated in FIGS. 10A and 10B and FIGS. 11A and 11B are described.

As the substrate 500 and the substrate 512, a substrate which can be applied to the substrate 400a in FIG. 8A can be used.

As each of the conductive layer 501a and the conductive layer 501b, a layer whose material is applicable to the conductive layer 401a in FIG. 8A can be used. Alternatively, the conductive layers 501a and 501b may be formed by stacking layers of materials applicable to the conductive layer 401a.

As the insulating layer 502, a layer whose material is applicable to the insulating layer 402a in FIG. 8A can be used. Alternatively, the insulating layer 502 may be formed by stacking layers whose materials are applicable to the insulating layer 402a.

As the semiconductor layer 503, a layer whose material is applicable to the oxide semiconductor layer 403a in FIG. 8A or a semiconductor layer including a semiconductor belonging to Group 14 such as silicon can be used.

As the conductive layers 504a and 504b, a layer whose material is applicable to the conductive layer 405a or the conductive layer 406a in FIG. 8A can be used. Alternatively, the conductive layers 504a and 504b may be formed by stacking layers of materials applicable to the conductive layer 405a or the conductive layer 406a.

As the insulating layer 505, a layer whose material is applicable to the insulating layer 407a in FIG. 8A can be used. Alternatively, the insulating layer 505 may be formed by a stack of layers applicable to the insulating layer 407a.

As each of the insulating layer 509 and the insulating layer 516, a layer of an organic material such as polyimide, acrylic, or benzocyclobutene can be used, for example. Alternatively, as the insulating layer 509, a layer of a low-dielectric constant material (also referred to as a low-k material) can be used.

As the conductive layer 510, for example, it is possible to use a layer of a light-transmitting conductive material such as indium tin oxide, a metal oxide in which zinc oxide is mixed in indium oxide (also referred to as indium zinc oxide (IZO)), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, indium tin oxide containing titanium oxide, or graphene. A conductive composition containing a conductive high molecule (also referred to as a conductive polymer) can be used to form the conductive layer 510. A conductive layer formed using the conductive composition preferably has a sheet resistance of 10000 ohms or less per square and a transmittance of 70% or more at a wavelength of 550 nm. Furthermore, the resistivity of the conductive high molecule contained in the conductive composition is preferably 0.1 Ω·cm or less.

As the conductive high molecule, a so-called π-electron conjugated conductive polymer can be used. As the π-electron conjugated conductive polymer, polyaniline or a derivative thereof, polypyrrole or a derivative thereof, polythiophene or a derivative thereof, or a copolymer of two or more of aniline, pyrrole, and thiophene or a derivative thereof can be given, for example.

As the light-blocking layer 513, a layer including a metal material can be used, for example.

For the liquid crystal layer 518, for example, a layer including TN liquid crystal, OCB liquid crystal, STN liquid crystal, VA liquid crystal, ECB liquid crystal, GH liquid crystal, polymer dispersed liquid crystal, discotic liquid crystal, or the like can be used.

As described with FIGS. 10A and 10B and FIGS. 11A and 11B, in the structural example of the display device of this embodiment includes the active matrix substrate provided with the transistor and the pixel electrode, the counter substrate, and the liquid crystal layer having liquid crystal between the active matrix substrate and the counter substrate.

Further, as described with reference to FIGS. 10A and 10B and FIGS. 11A and 11B, in the structural example of the display device of this embodiment, the light-blocking layer is provided in a portion other than a portion through which light is transmitted. With the above structure, light incidence on the transistor provided for the active matrix substrate can be suppressed, for example; thus, variation in electronic characteristics (such as a threshold voltage) of the transistor due to light can be suppressed.

Further, with the structure of the display device described in this embodiment, a circuit such as a display driver circuit can be provided over a substrate where a display circuit is provided. In this case, the transistor in the circuit such as a display driver circuit may have the same structure as the transistor in the display circuit. With the above structure, the display circuit and the display driver circuit can be formed over one substrate by the same steps; thus, defects of connection between the display circuit and the display driver circuit can be reduced.

Embodiment 6

In this embodiment, examples of electronic devices each provided with the display device of the above embodiments will be described.

Structural examples of electronic devices of this embodiment are described with reference to FIGS. 12A to 12D. FIGS. 12A to 12D are schematic views illustrating of structural examples of electronic devices of this embodiment.

Figure 12A:
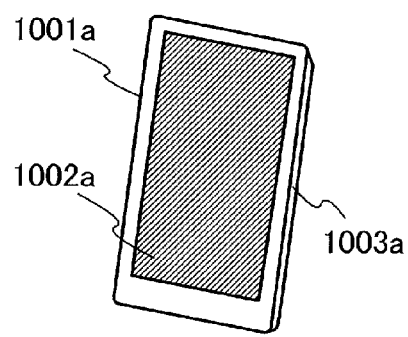
FIGS. 12A to 12D are schematic views each illustrating an example of an electronic device in Embodiment 6

An electronic device illustrated in FIG. 12A is an example of a portable information terminal. The portable information terminal in FIG. 12A includes a housing 1001a and a display portion 1002a provided in the housing 1001a.

Note that, on a side surface 1003a of the housing 1001a, a connection terminal to which an external device is connected and one or plural buttons for operating the portable information terminal in FIG. 12A may be provided.

In the housing 1001a of the portable information terminal illustrated in FIG. 12A, a CPU, a memory circuit, an interface with which signals are transmitted/received between the external device and the CPU and the memory circuit, and an antenna which sends and receives the signals to/from the external device are provided.

The portable information terminal illustrated in FIG. 12A has a function of one or more of a telephone set, an electronic book, a personal computer, and a game machine.

Figure 12B:
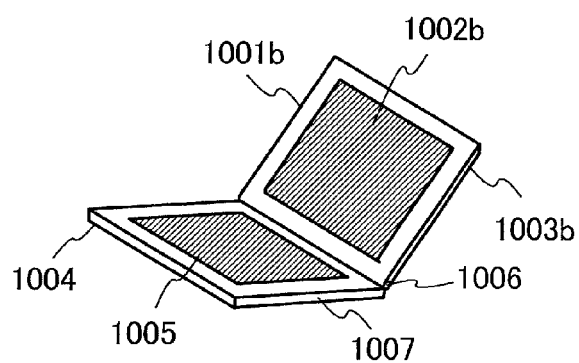

An electronic device illustrated in FIG. 12B is an example of a foldable portable information terminal. The portable information terminal illustrated in FIG. 12B includes a housing 1001b, a display portion 1002b provided in the housing 1001b, a housing 1004, a display portion 1005 provided in the housing 1004, and a hinge 1006 for connecting the housing 1001b and the housing 1004.

In the case of the portable information terminal illustrated in FIG. 12B, the housing 1001b or the housing 1004 is moved with the hinge 1006, whereby the housing 1001b can be stacked over the housing 1004.

Note that on a side surface 1003b of the housing 1001b or a side surface 1007 of the housing 1004, a connection terminal to which an external device is connected and one or plural buttons for operating the portable information terminal in FIG. 12B may be provided.

The display portion 1002b and the display portion 1005 may display different images or one image. Note that the display portion 1005 is not necessarily provided, and a keyboard which is an input device may be provided instead of the display portion 1005.

In the housing 1001b or the housing 1004 of the portable information terminal illustrated in FIG. 12B, a CPU, a memory circuit, and an interface with which signals are transmitted/received between the external device and the CPU and the memory circuit are provided. Note that for the portable information terminal illustrated in FIG. 12B, an antenna which sends and receives the signals to/from the external device may be provided.

The portable information terminal illustrated in FIG. 12B has a function of one or more of a telephone set, an electronic book, a personal computer, and a game machine.

Figure 12C:
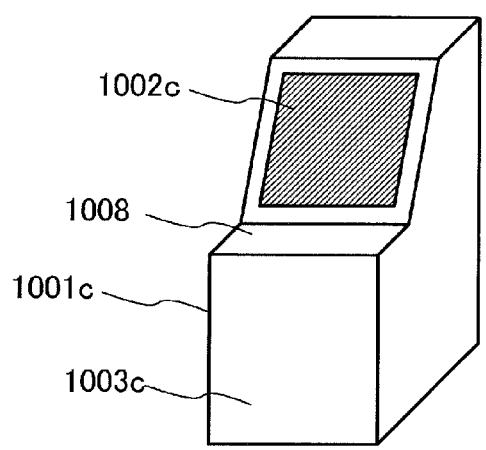

An electronic device illustrated in FIG. 12C is an example of a stationary information terminal. The stationary information terminal in FIG. 12C includes a housing 1001c and a display portion 1002c provided in the housing 1001c.

Note that the display portion 1002c can be provided on a deck portion 1008 of the housing 1001c.

In the housing 1001c of the stationary information terminal illustrated in FIG. 12C, a CPU, a memory circuit, and an interface with which signals are transmitted/received between the external device and the CPU and the memory circuit are provided. Note that for the stationary information terminal illustrated in FIG. 12C, an antenna which sends and receives the signals to/from the external device may be provided.

Further, on a side surface 1003c of the housing 1001c in the stationary information terminal illustrated in FIG. 12C, one or more of a ticket output portion which outputs a ticket or the like, a coin slot, and a bill slot may be provided.

The stationary information terminal illustrated in FIG. 12C has a function of, for example, an automated teller machine, an information communication terminal (also referred to as a multimedia station) for ordering information goods such as a ticket, or a game machine.

Figure 12D:
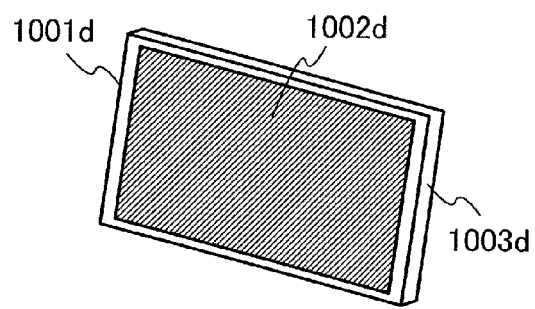

FIG. 12D is an example of a stationary information terminal. The stationary information terminal illustrated in FIG. 12D includes a housing 1001d and a display portion 1002d provided in the housing 1001d. Note that a supporting base which supports the housing 1001d may be provided.

Note that on a side surface 1003d of the housing 1001d, a connection terminal to which an external device is connected and one or plural buttons for operating the stationary information terminal in FIG. 12D may be provided.

In the housing 1001d of the stationary information terminal illustrated in FIG. 12D, a CPU, a memory circuit, and an interface with which signals are transmitted/received between the external device and the CPU and the memory circuit may be provided. Note that an antenna which sends and receives the signals to/from the external device may be provided in the stationary information terminal illustrated in FIG. 12D.

The stationary information terminal illustrated in FIG. 12D has a function of, for example, a digital photo frame, a monitor, or a television set.

The display device described in the above embodiments is used for a display portion of an electronic device, and for example, used for the display portions 1002a to 1002d illustrated in FIGS. 12A to 12D. Further, the display device of the above embodiments may be used for the display portion 1005 illustrated in FIG. 12B.

As description with reference to FIGS. 12A to 12D, the example of the electronic device of this embodiment has a structure in which the display portion including the display device described in the above embodiments is provided.

Further, in the example of the electronic device of this embodiment, the housing may be provided with one or more of a photoelectric conversion portion which generates power supply voltage by incident light and an operation portion for operating the display device. For example, when the photoelectric conversion portion is provided, an external power supply is not needed; thus, the above-described electronic device can be used for a long time even in an environment where an external power supply is not provided.

This application is based on Japanese Patent Application serial no. 2010-231315 filed with Japan Patent Office on Oct. 14, 2010, the entire contents of which are hereby incorporated by reference.

What is claimed is:

1. A display device comprising:
a plurality of display circuits arranged in M rows (M is a natural number of 2 or more) and N columns (N is a natural number), wherein the M rows include a first group of consecutive rows of the M rows, and a second group of consecutive rows of the M rows, and wherein the first group does not overlap with the second group; and
a light unit overlapping with the plurality of display circuits, the light unit comprising:
a plurality of light-emitting diode groups arranged in X rows (X is a natural number of 2 or more), wherein the plurality of light-emitting diode groups arranged in one of the X rows overlaps with one row of the first group of the plurality of display circuits, the plurality of light-emitting diode groups arranged in another one of the X rows overlaps with one row of the second group of the plurality of display circuits, and each of the light-emitting diode groups includes a light-emitting diode emitting red light, a light-emitting diode emitting green light, and a light-emitting diode emitting blue light; and
a light guide plate formed between the plurality of display circuits and the plurality of light-emitting diode groups and in contact with the plurality of light-emitting diode groups, the light guide plate comprising X light guide members arranged in a column direction of the light-emitting diode groups so that each member corresponds to one of the rows of light-emitting diodes,
the display device being configured so that
the one row of the first group of the plurality of display circuits is in a writing state to be input with first display data signals corresponding to a first color or combination of colors at the same time as the one row of the second group of the plurality of display circuits is in the writing state to be input with second display data signals corresponding to a second color or combination of colors different from the first color or combination of colors, and
during the writing state, the light-emitting diodes arranged in the one row of the X rows and the light-emitting diodes arranged in the another row of the X rows are in an off state,
wherein each of the X light guide members overlaps a corresponding one of the X rows of light-emitting diodes,
wherein side surfaces of the X light guide members have light-reflective properties, and
wherein top and bottom surfaces of the X light guide members have light-transmitting properties.

2. The display device according to claim 1, wherein the plurality of light-emitting diode groups is arranged in a grid pattern.

3. The display device according to claim 1, wherein the plurality of light-emitting diode groups is arranged in a staggered pattern.

4. The display device according to claim 1, wherein each of the plurality of display circuits includes a display selection transistor and a liquid crystal element.

5. The display device according to claim 1, further comprising a diffusion sheet overlapping with the plurality of light-emitting diode groups with the light guide plate interposed therebetween,
wherein the diffusion sheet is a sheet by which light is diffused in a circular pattern or an elliptic pattern.

6. The display device according to claim 1, further comprising a diffusion sheet overlapping with the plurality of light-emitting diode groups with the light guide plate interposed therebetween,
wherein a distance between the light guide plate and the diffusion sheet is 5 mm or smaller.

7. The display device according to claim 1,
wherein a light-reflecting film with a thickness of 0.2 µm or larger is formed on each of the side surfaces of the X light guide members.

8. A display device comprising:
a plurality of display circuits arranged in M rows (M is a natural number of 2 or more) and N columns (N is a natural number), wherein the M rows include a first group of consecutive rows of the M rows, and a second group of consecutive rows of the M rows, and wherein the first group does not overlap the second group; and
a light unit overlapping with the plurality of display circuits, the light unit comprising:
a plurality of light-emitting diode groups arranged in X rows (X is a natural number of 2 or more), wherein the plurality of light-emitting diode groups arranged in one of the X rows overlaps with one row of the first group of the plurality of display circuits, the plurality of light-emitting diode groups arranged in another one of the X rows overlaps with one row of the second group of the plurality of display circuits, and each of the light-emitting diode groups includes a light-emitting diode emitting red light, a light-emitting diode emitting green light, and a light-emitting diode emitting blue light; and
a light guide plate formed between the plurality of display circuits and the plurality of light-emitting diode groups and in contact with the plurality of light-emitting diode groups, the light guide plate comprising X light guide members overlapping with light-emitting diodes in successive plural rows out of the plurality of light-emitting diode groups; and
the display device being configured so that
the one row of the first group of the plurality of display circuits is in a writing state to be input with first display data signals corresponding to a first color or combination of colors at the same time as the one row of the second group of the plurality of display circuits is in the writing state to be input with second display data signals corresponding to a second color or combination of colors different from the first color or combination of colors, and
during the writing state, the light-emitting diodes arranged in the one row of the X rows and the light-emitting diodes arranged in the another row of the X rows are in an off state,
wherein each of the X light guide members overlaps a corresponding one of the X rows of light-emitting diodes,
wherein side surfaces of the X light guide members have light-reflective properties, and
wherein top and bottom surfaces of the X light guide members have light-transmitting properties.

9. The display device according to claim 8,
wherein the plurality of light-emitting diode groups is arranged in a grid pattern.

10. The display device according to claim 8,
wherein the plurality of light-emitting diode groups is arranged in a staggered pattern.

11. The display device according to claim 8,
wherein each of the plurality of display circuits includes a display selection transistor and a liquid crystal element.

12. The display device according to claim 8, further comprising a diffusion sheet overlapping with the plurality of light-emitting diode groups with the light guide plate interposed therebetween,
wherein the diffusion sheet is a sheet by which light is diffused in a circular pattern or an elliptic pattern.

13. The display device according to claim 8, further comprising a diffusion sheet overlapping with the plurality of light-emitting diode groups with the light guide plate interposed therebetween,
wherein a distance between the light guide plate and the diffusion sheet is 5 mm or smaller.

14. The display device according to claim 8,
wherein a light-reflecting film with a thickness of 0.2 μm or larger is formed on each of the side surfaces of the X light guide members.

15. A display device comprising:
a plurality of display circuits arranged in M rows (M is a natural number of 2 or more) and N columns (N is a natural number), wherein the M rows include a first group of consecutive rows of the M rows, and a second group of consecutive rows of the M rows, and wherein the first group does not overlap the second group; and
a light unit overlapping with the plurality of display circuits, the light unit comprising:
a plurality of light-emitting diode groups arranged in X rows (X is a natural number of 2 or more), wherein the plurality of light-emitting diode groups arranged in one of the X rows overlaps with one row of the first group of the plurality of display circuits, the plurality of light-emitting diode groups arranged in another one of the X rows overlaps with one row of the second group of the plurality of display circuits, and each of the light-emitting diode groups includes a light-emitting diode emitting red light, a light-emitting diode emitting green light, and a light-emitting diode emitting blue light; and
a light guide plate formed between the plurality of display circuits and the plurality of light-emitting diode groups and in contact with the plurality of light-emitting diode groups, the light guide plate comprising X light guide members arranged in a column direction of the light-emitting diode groups so that each member corresponds to one of the X rows of light-emitting diodes,
the display device being configured so that
the one row of the first group of the plurality of display circuits is in a writing state to be input with first display data signals corresponding to a first color or combination of colors at the same time as the one row of the second group of the plurality of display circuits is in the writing state to be input with second display data signals corresponding to a second color or combination of colors different from the first color or combination of colors,
during the writing state, the light-emitting diodes arranged in the one row of the X rows and the light-emitting diodes arranged in the another row of the X rows are in an off state, and
during the writing state, the light-emitting diodes arranged in a third one of the X rows emit light,
wherein each of the X light guide members overlaps a corresponding one of the X rows of light-emitting diodes,
wherein side surfaces of the X light guide members have light-reflective properties, and
wherein top and bottom surfaces of the X light guide members have light-transmitting properties.

16. The display device according to claim 15,
wherein the plurality of light-emitting diode groups is arranged in a grid pattern.

17. The display device according to claim 15,
wherein the plurality of light-emitting diode groups is arranged in a staggered pattern.

18. The display device according to claim 15,
wherein each of the plurality of display circuits includes a display selection transistor and a liquid crystal element.

* * * * *